Figure 11:
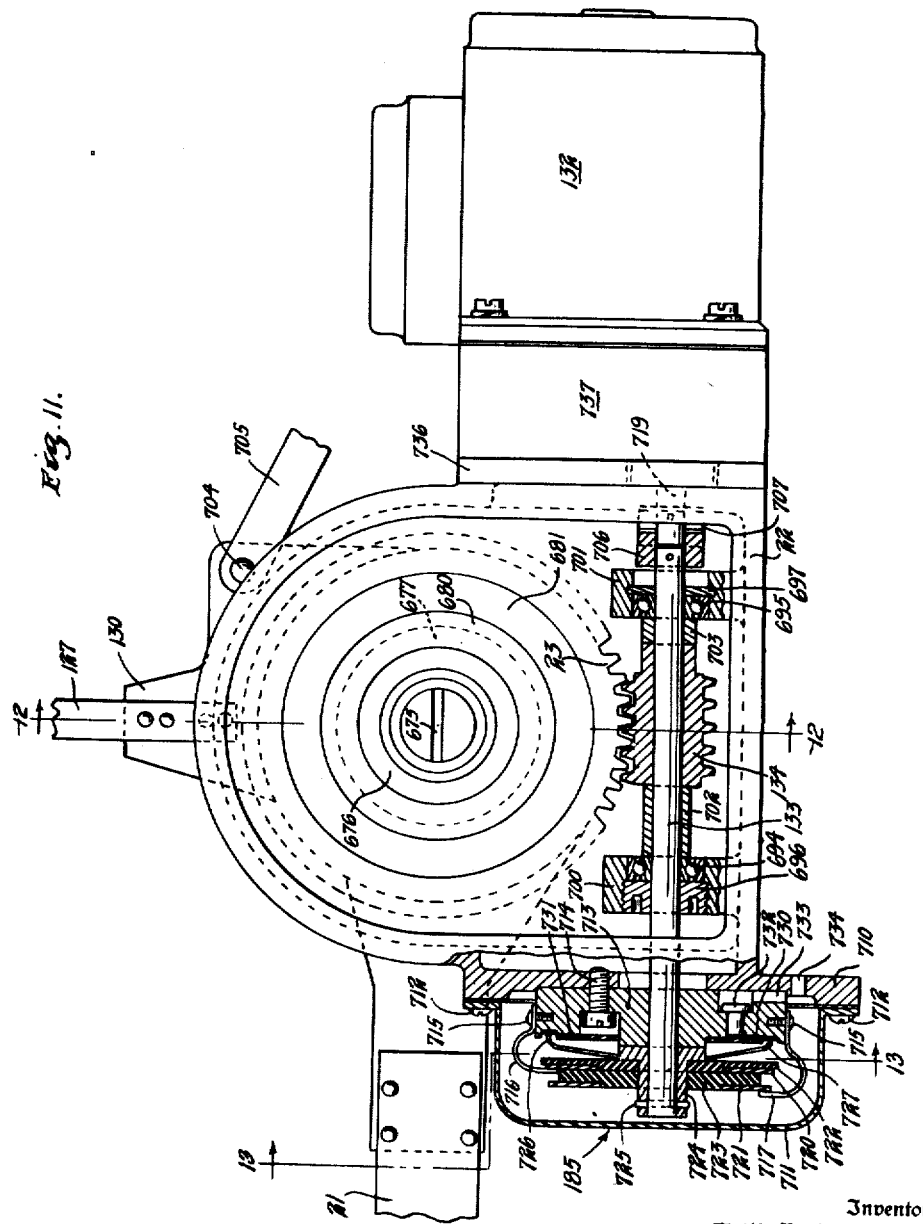

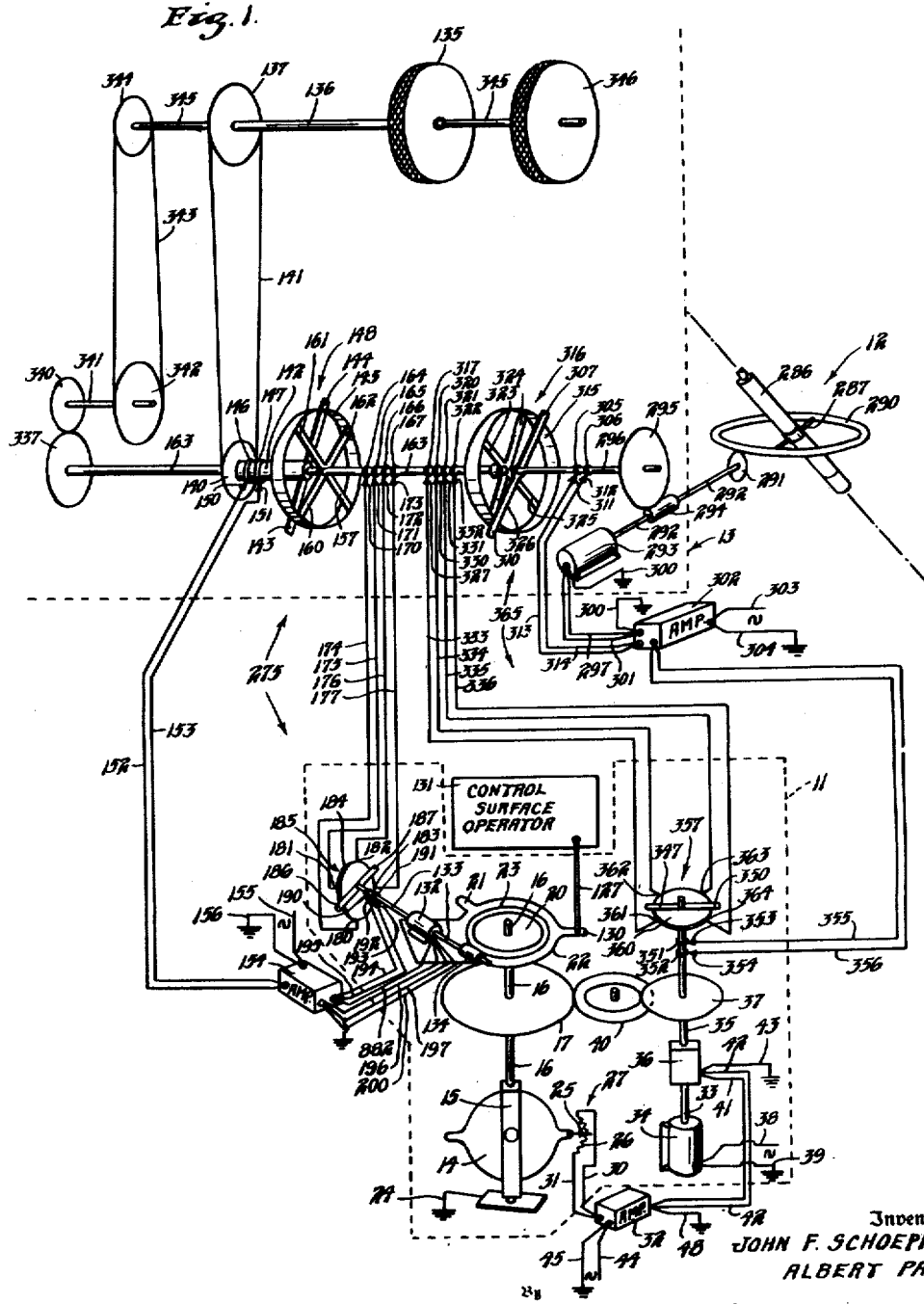

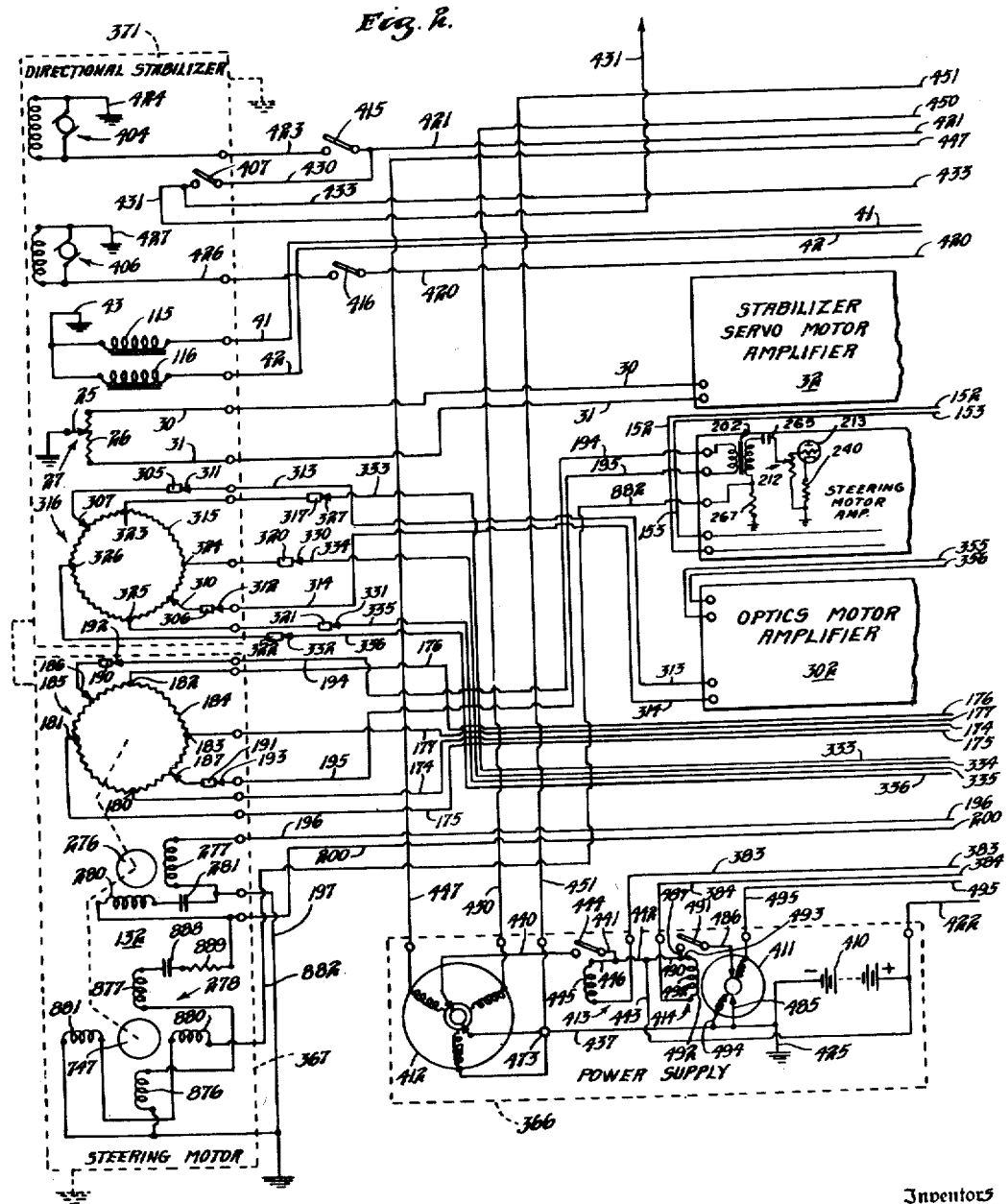

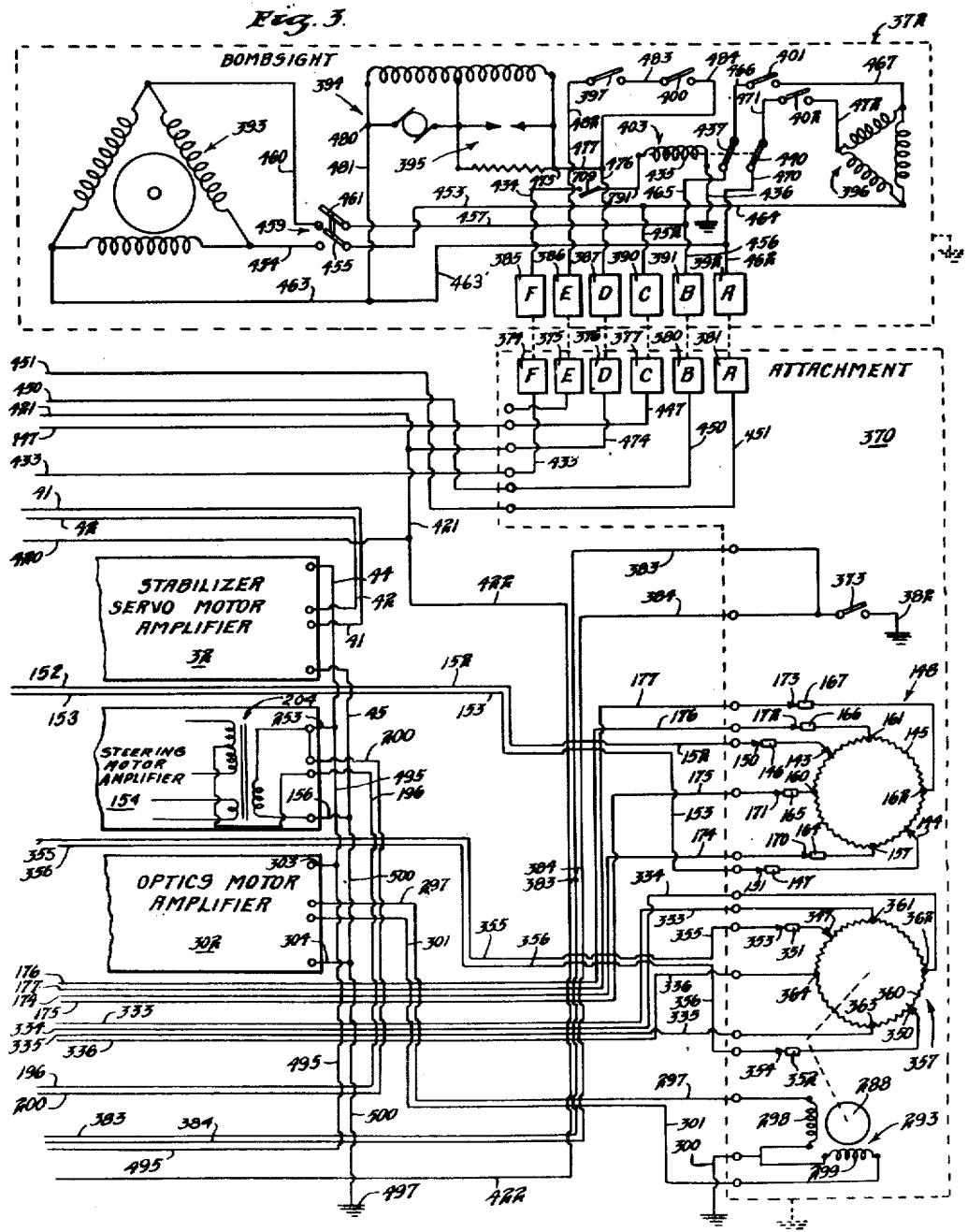

Oct. 10, 1950  J. F. SCHOEPPEL ET AL  2,524,998
CONTROL APPARATUS
Filed March 16, 1944  10 Sheets-Sheet 4
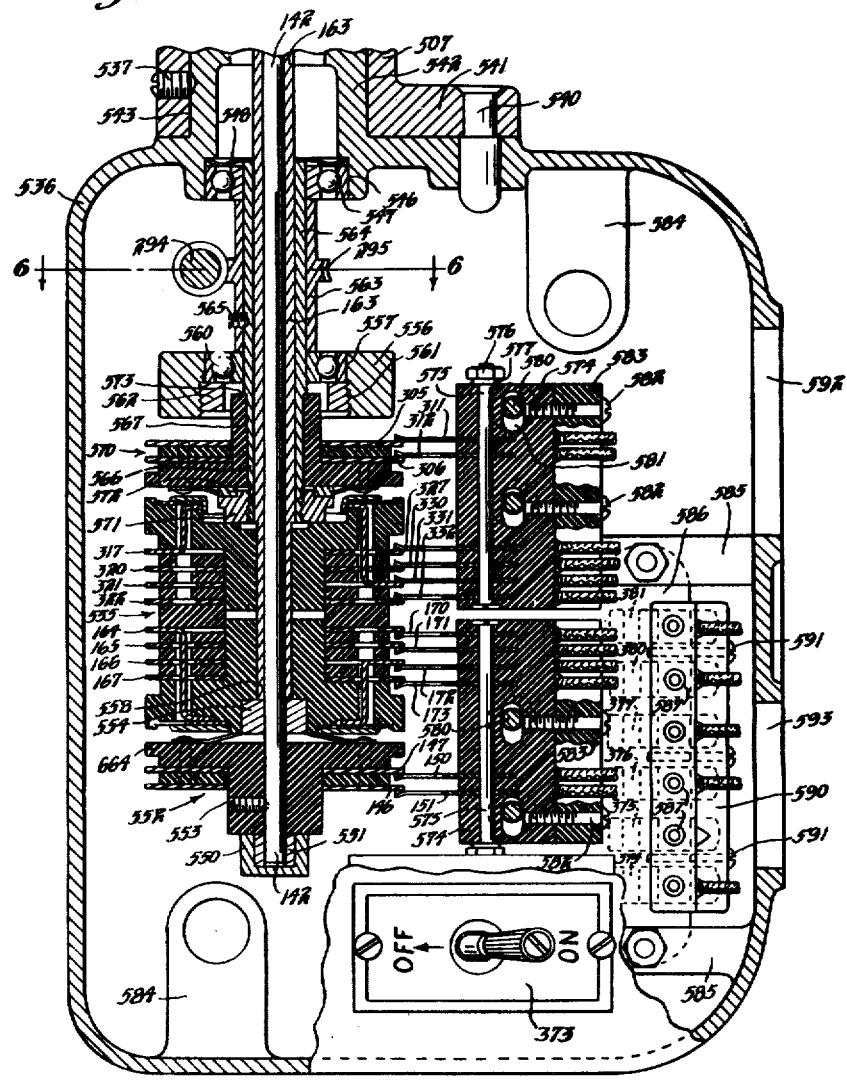
Inventors
JOHN F. SCHOEPPEL
ALBERT PALYA
George H Fisher
Attorney

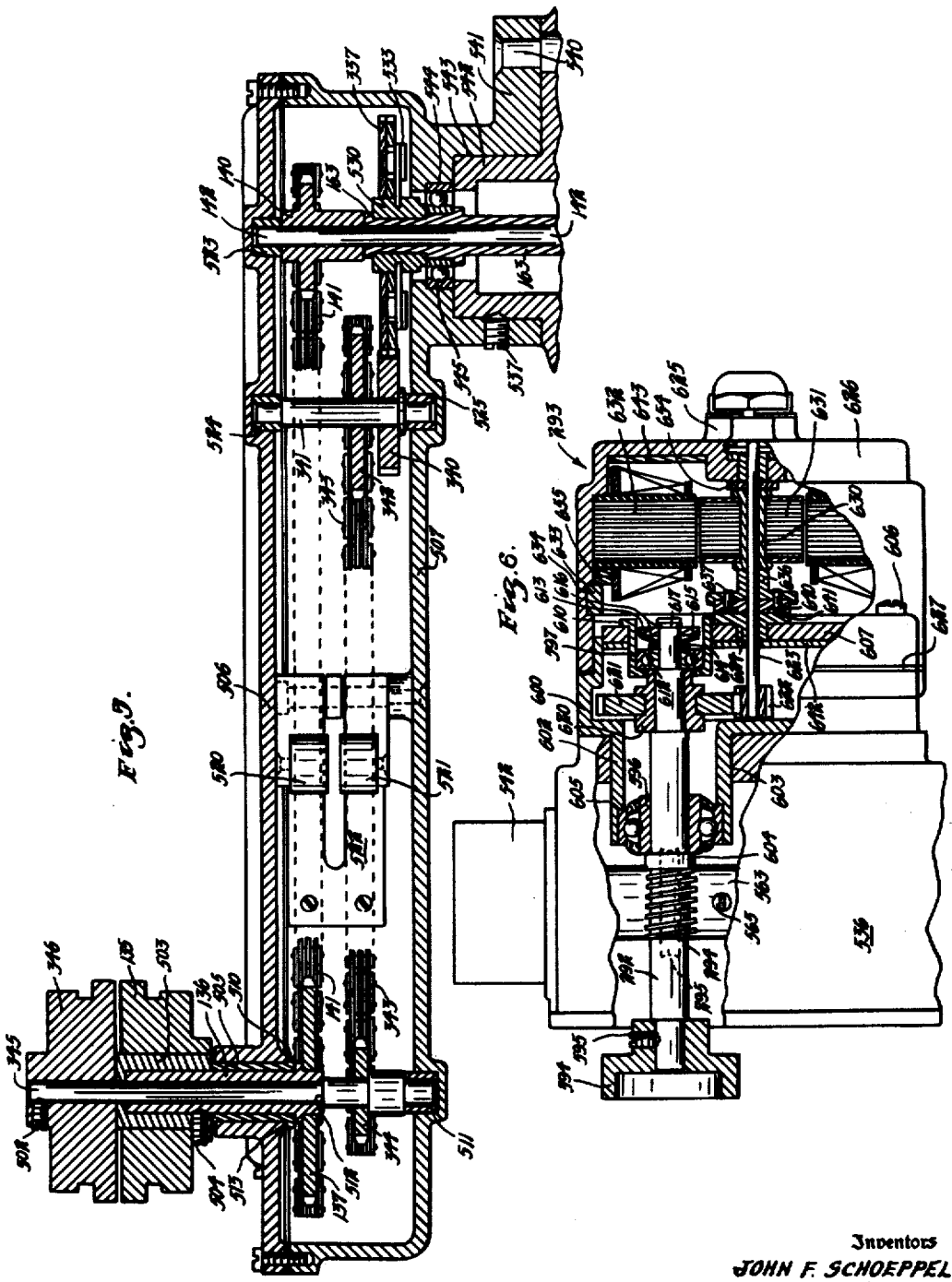

Oct. 10, 1950  J. F. SCHOEPPEL ET AL  2,524,998
CONTROL APPARATUS
Filed March 16, 1944  10 Sheets—Sheet 6
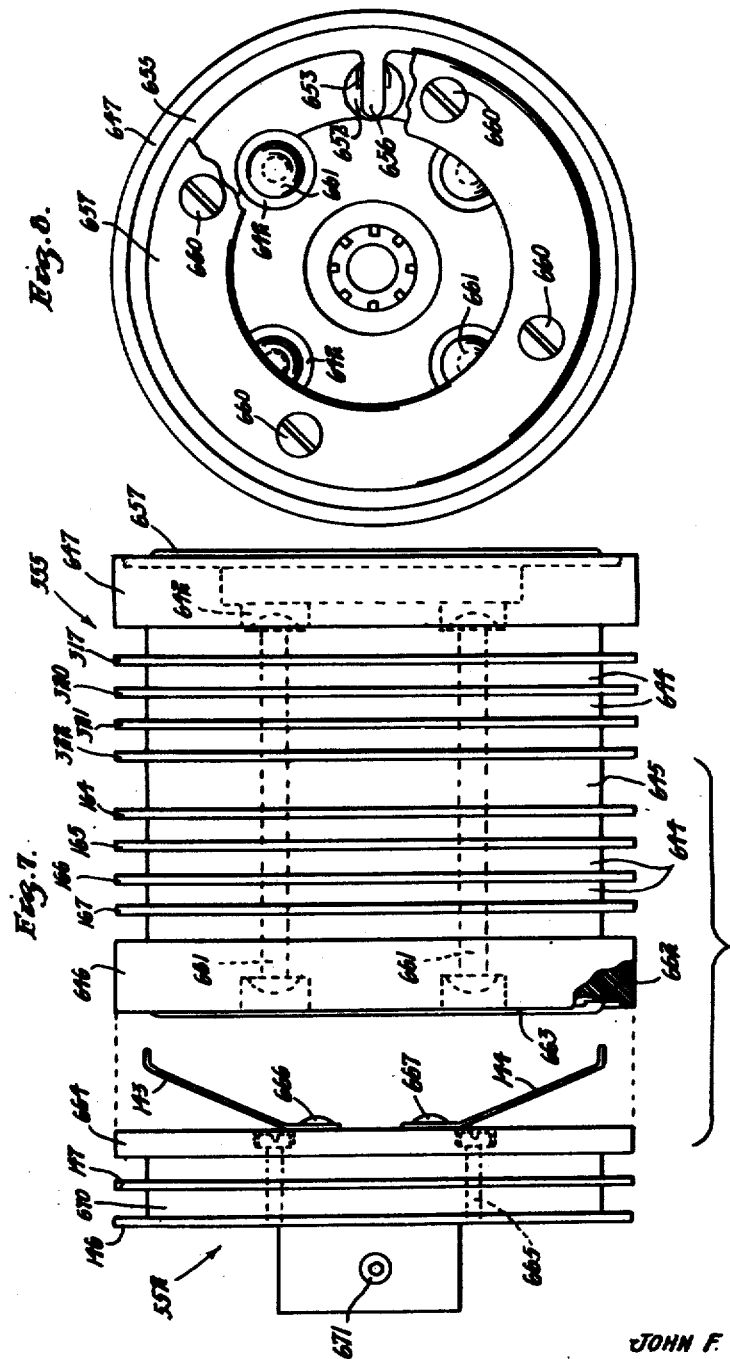
Inventors
JOHN F. SCHOEPPEL
ALBERT PALYA
George H. Fisher
Attorney

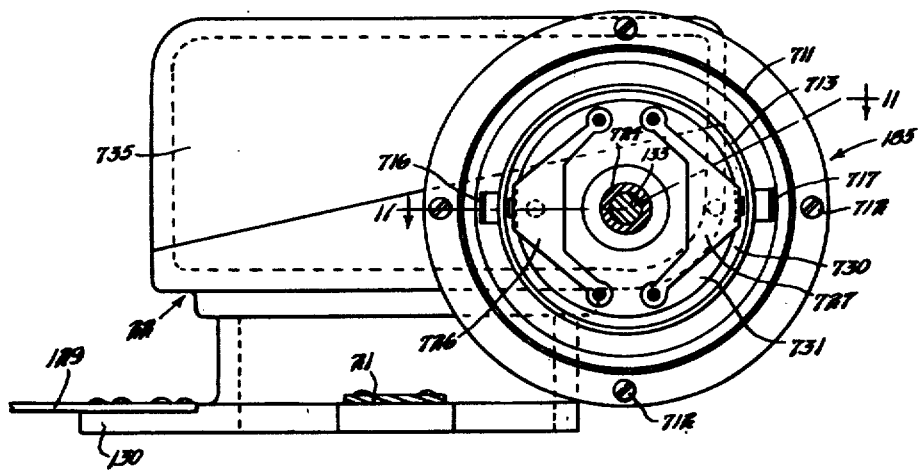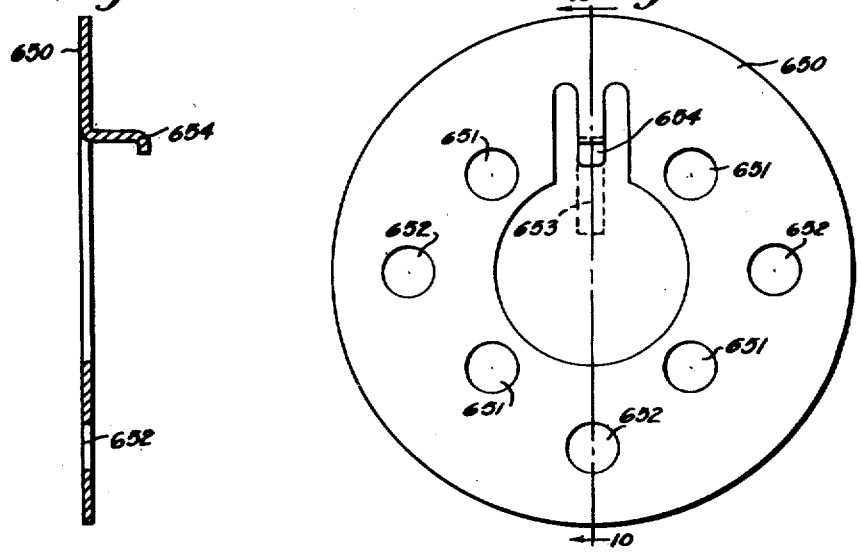

Oct. 10, 1950  J. F. SCHOEPPEL ET AL  2,524,998
CONTROL APPARATUS

Filed March 16, 1944  10 Sheets-Sheet 8

Inventors
JOHN F. SCHOEPPEL
ALBERT PALYA.

George N. Fisher
Attorney

Oct. 10, 1950  J. F. SCHOEPPEL ET AL  2,524,998
CONTROL APPARATUS

Filed March 16, 1944  10 Sheets-Sheet 9

Inventors
JOHN F. SCHOEPPEL
ALBERT PALYA

George H. Fisher
Attorney

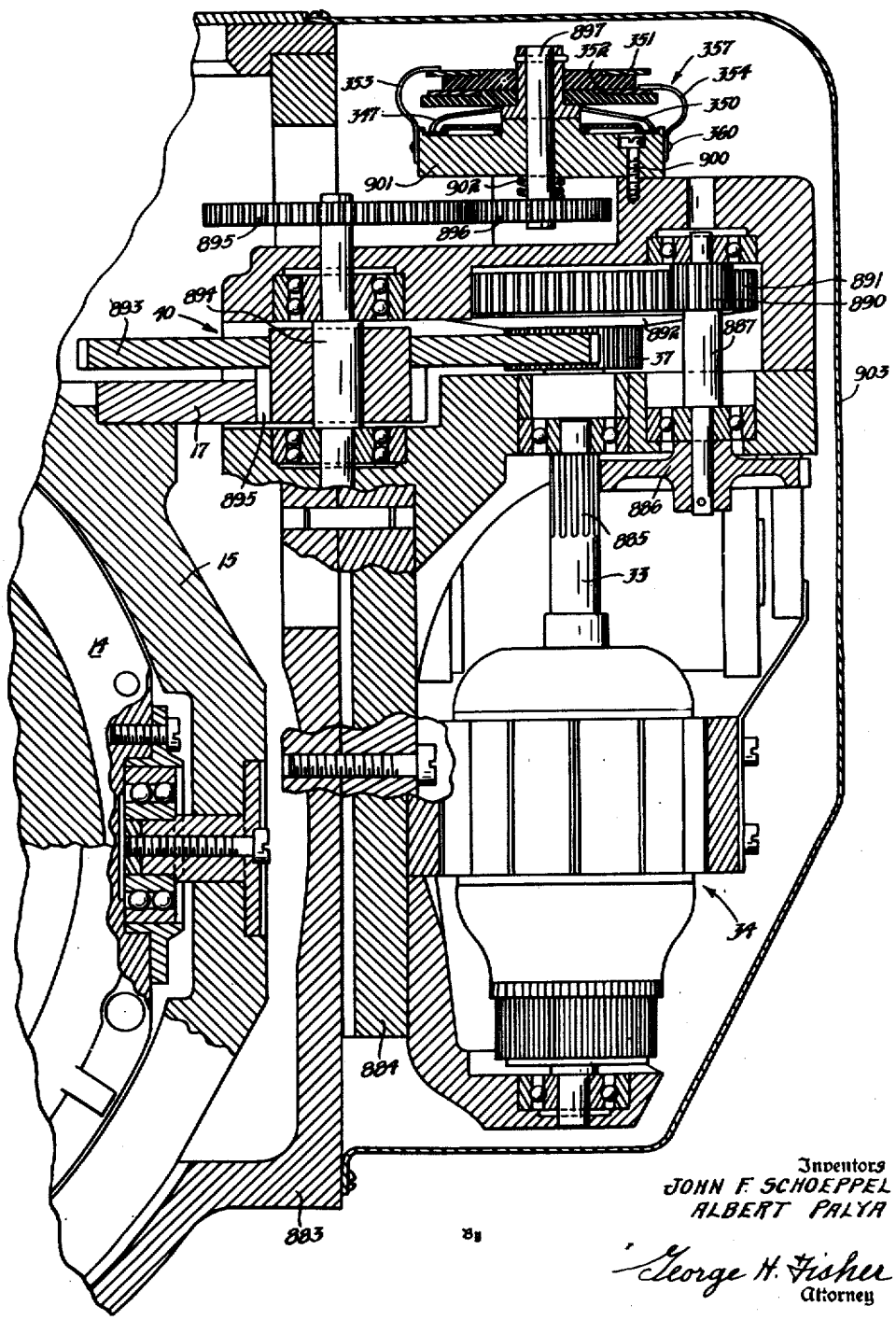

Patented Oct. 10, 1950

2,524,998

UNITED STATES PATENT OFFICE 2,524,998

CONTROL APPARATUS

John F. Schoeppel and Albert Palya, Minneapolis, Minn., assignors to Minneapolis-Honeywell Regulator Company, Minneapolis, Minn., a corporation of Delaware Application March 16, 1944, Serial No. 526,806

28 Claims. (Cl. 318—489)

This invention relates to control apparatus generally and more specifically to means for controlling the course of an aircraft and the azimuth of a line of sight in the performance of bombing operations.

The problem in bombing from an aircraft is to release a projectile from a plane, moving in a given direction at a given speed with respect to a target and at given altitude above the target, at such a point in space and time that the bomb having fallen from the releasing craft impacts upon the target.

The field of bombsights is substantially comprehended in two main subdivisions—synchronous bombsights and point-of-impact bombsights. A synchronous sight, as is well known, includes mechanism whereby a line of sight can be moved with respect to the plane in which it is carried at such speeds and in such directions as to make the target appear stationary in the field of the sight during bombing runs at various altitudes and airspeeds. A point-of-impact sight, on the other hand, is directed at all times toward the point where a projectile, if released at the instant of observation, would impact the ground.

Two principal factors enter into the performance of the bombing run. One is determination of the range, that is, the distance along the course of the craft between the target and the point at which the projectile should be released. The other is determining the proper heading of the craft, the wind velocity being considered, to give the projectile such an initial direction when released that it will pursue a path in its fall ending directly upon the target. The former will be referred to herein as the range factor in bombing and the latter as the azimuth factor. The present invention relates solely to the azimuth factor.

In both synchronizing and point-of-impact bombing, it is necessary that the plane be moving in a certain direction at the point of release of the bomb for the bomb to land on the target even if the range factor is correct. Furthermore, in both synchronizing and point-of-impact bombsights, means are provided for adjusting the sight in azimuth to take into account the varying drift angles occurring as a result of varying wind factors. The drift angle, it is understood, is the angle between the ground path of the craft and its heading: In the absence of wind having components normal to the course of the craft, the drift angle is zero. When flying in a wind having a component normal to the course of the craft, the nose of the craft must be pointed in a direction other than directly toward the target if the ground path of the plane is to be directly through the target. The azimuth factor in a synchronizing bombsight has for its purpose to so direct the line of sight of the bombardier that when the target appears to remain on the crosshairs of the sight a proper drift angle has been established, and the plane is following such a course that a projectile released at the proper moment will impact the target. In a point-of-impact sight, when the target appears to be moving along the range cross hair without deviation to either side, the same situation exists.

It is understood that some form of communication between the bombardier and the pilot of the craft must be provided, so that the observations of the bombardier may be translated into maneuvers of the craft effective to place it on the desired course. Direct telephone connections and pilot-directing instruments have both been employed for this purpose, particularly with aircraft which are flown manually by the pilot. However, in modern bombers where an automatic flight control system is provided for the purpose, as far as bombing is concerned, of maintaining a stable platform for the bombsight, it is obviously more efficient to arrange some sort of mechanism whereby, in the operation of the bombsight, the bombardier also operates control surfaces of the aircraft. Such bombsights are known.

In the azimuth factor of bombing two principal procedures have been established. The first or "rate" procedure includes means for altering the azimuth of the bombsight by means of an azimuth knob operated by the bombardier, the rate at which the azimuth is changed depending upon the degrees of displacement of the azimuth knob. The second or "displacement" procedure comprises altering the azimuth of the sight by the use of a drift angle knob, the magnitude of the displacement rather than its rate being determined by the angular displacement of the drift angle knob.

An object of our invention is to provide an efficient accurate combination of a bombsight, a directional gyroscope, and a flight control system in which the functions of the various components are coordinated in a novel fashion.

Another object of our invention is to provide such a combination including a pair of improved telemetric systems in which a motor energized by the first system is operative to vary the heading of the craft in which the flight control system is installed and the motor energized by the second system is operative to vary the azimuth of the line of sight of the bombsight with respect to the craft, together with first manual means for affecting the balance of the first telemetric system and second manual means for independently affecting the balance of both telemetric systems simultaneously and with means whereby deviation of the aircraft from a predetermined course may independently affect the balance of the second telemetric system.

Another object of our invention is to provide a control attachment adapted to be assembled mechanically to a bombsight and comprising a pair of improved potentiometers together with first manual means rotating the resistance elements of the potentiometers as a unit, second manual means rotating the contact portion of one of the potentiometers and further a motor actuated means for rotating the contact portion of the other potentiometer; means also being provided for coupling the above mentioned motor with a driven member in the bombsight, for conducting electrical energy to the attachment, and for conducting electrical energy through the attachment and to the bombsight circuits under suitable supervisory control.

Yet another object of our invention is to provide means whereby the course of a vehicle may be changed by operation of a remote control knob, the change being made at a constant rate, and through an angle proportional to the angular displacement of the control knob.

A further object of our invention is to provide, in course control apparatus regulated by a directional gyroscope, motor means for varying the normal relation between the directional gyroscope and the link joining it with the element actuating the course control member of the aircraft.

A further object of our invention is to provide a potentiometer, one portion of which is stabilized in space about an axis, while the other portion is movable with respect thereto in accordance with the departure of a vehicle from a predetermined course.

A still further object of our invention is to provide means whereby the azimuth of the line of sight of a bombsight, with respect to an aircraft, may be changed by the operation of a remote control knob, the change being made at a constant rate and through an angle proportional to the angular displacement of the control knob.

Further objects and advantages of our invention are set forth in the following description, taken with the accompanying drawings, and the novel features thereof are pointed out in the appended claims. The disclosure, however, is illustrative only and I may make changes in detail, especially in matters of shape, size, and arrangement of parts within the principle of the invention, to the full extent indicated by the broad general meanings of the terms in which the appended claims are expressed.

Figure 12:
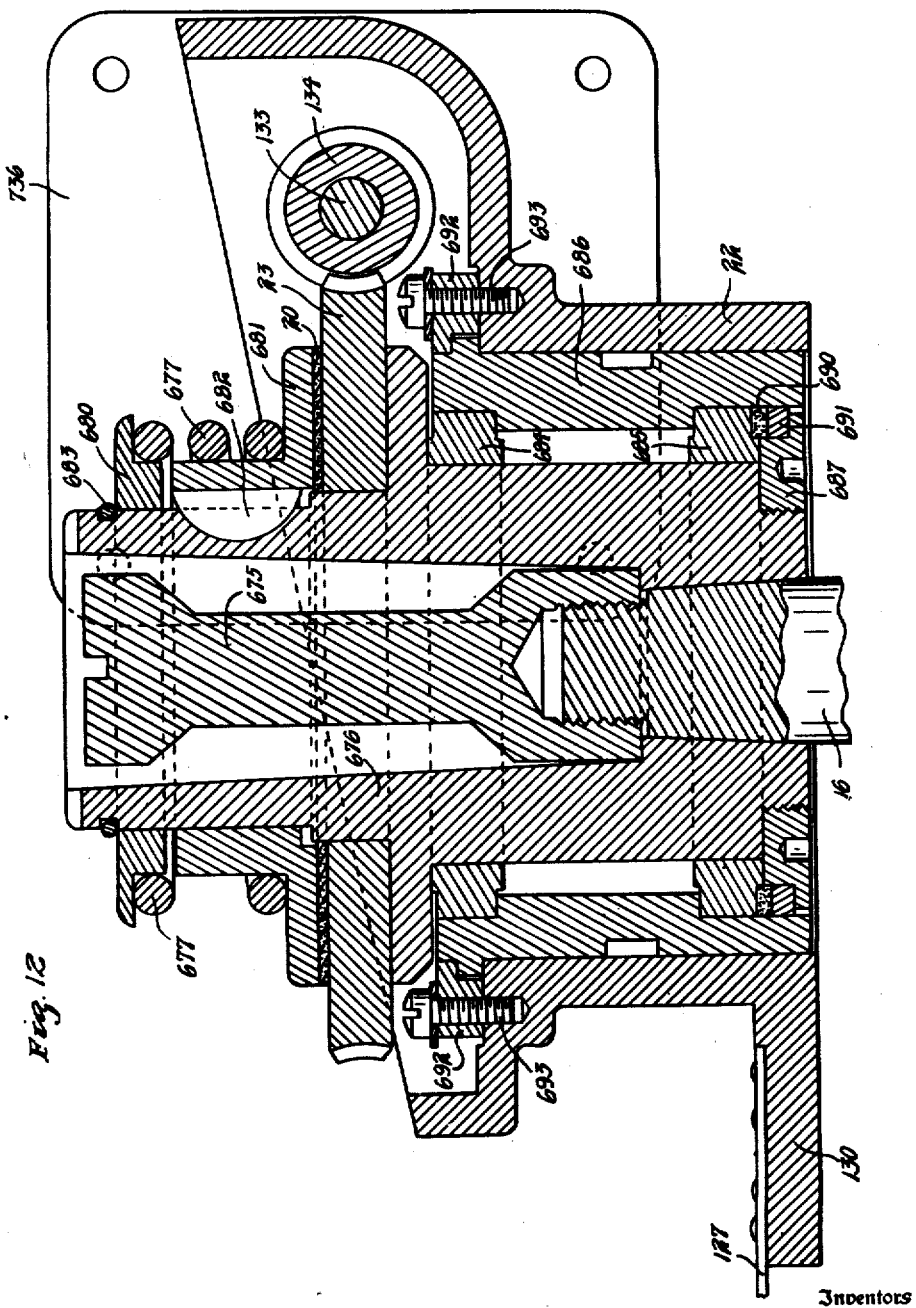

In the drawing:

Figure 1 is a schematic representation of the general system comprising the subject matter of our invention, Figures 2 and 3 taken together disclose a complete electrical wiring diagram, schematic in parts, of our system, together with the necessary sources of electrical energy, and utilizing circuits in the bombsight, Figure 4 is a sectional view of a portion of a control attachment comprising a preferred embodiment of a portion of our invention, Figure 5 is a sectional view of the remaining portion of the embodiment in Figure 4, Figure 6 is a side view of the device shown in Figure 4, a portion being broken away along the line generally indicated by 6—6 in Figure 4 to disto disclose features of internal structure, Figure 7 is a side view of a potentiometer particularly adapted for use in an embodiment of our invention, a portion being broken away for purposes of illustration, Figure 8 is a view of the device shown in Figure 7 as seen from the right, portions also being broken away for purposes of illustration, Figure 9 shows a slip ring as used in the potentiometer shown in Figure 6, Figure 10 is a sectional view taken along line 10—10 in Figure 9, Figure 11 is a plan view of our motor drive attachment, certain parts being broken away for purposes of illustration, Figure 12 is a sectional elevation of our motor drive attachment, taken along the line indicated by 12—12 in Fig. 11, Figure 13 is an elevational view of our steering motor drive, more clearly disclosing certain features thereof, parts being broken away along a line generally indicated by 13—13 in Figure 11, Figure 14 is a sectional view of a potentiometer adapted for cooperation with a directional stabilizer in the practice of our invention, together with adjacent parts of the stabilizer.

Referring now to Figure 1, it will be seen that an embodiment of our invention comprises a directional stabilizer indicated generally by reference numeral 11, a bombsight indicated schematically by reference numeral 12, and a control attachment for coordinating and controlling the relationship between the bombsight and the directional stabilizer, generally indicated by reference numeral 13; suitable amplifiers are also required to energize various electrical elements comprised in the main units just recited.

Directional stabilizer 11 comprises a gyroscope 14 including a rotor energized in any convenient fashion for rotation at high speed about a generally horizontal spin axis which defines the stabilized azimuth axis of the plane. Gyroscope 14 is pivotally mounted in a gimbal ring 15 which is rotatable about a normally vertical axis. A shaft 16 extends vertically from gyroscope 14: rigid upon shaft 16 are a gear 17 and a clutch 20, and rotatable upon shaft 16 is a housing 22 which includes a locking arm 21 arranged to cooperate with any suitable clamping mechanism, not shown, to lock member 22 to the craft, when this action is desired. It is clear that, arm 21 remaining unlocked, gyroscope 14 and gimbal ring 15 remain motionless with respect to the craft as long as the motion of the latter has the direction of the stabilized axis.

If the azimuth axis of the craft moves in a direction other than parallel to itself; that is, if the craft turns to the left or to the right, the gyroscopic rigidity imparted to shaft 16 simply causes the gimbal to remain fixed in space while the craft turns around it. However, a locking arm 21 is provided, on a housing 22 rotatably carried by shaft 16, for cooperating with any suitable clamping mechanism, not shown, to fix member 22 against rotation about the axis of shaft 16.

Gyroscope 14 is grounded as shown at 24 through its gimbal ring, and carries a movable contact 25 adapted to move over the resistance member 26 of a potentiometer indicated generally at 27. Electrical connections are made to the ends of resistance member 26 as by conductors 30 and 31 and these conductors lead to an amplifier 32. According to the well known principles of gyroscope operation, any force applied about the axis of shaft 16 results, not in rotation of gimbal 15 about that axis, but in rotation of housing 14 about its axis in gimbal 15, moving contact 25 of potentiometer 27 upward or downward along winding 26, depending on the direction of action of the force and the direction of rotation of the gyro rotor: the degree of movement of contact 25 depends on the magnitude of the applied force.

Use is made of this movement of housing 14 through an amplifier 32 and a clutch means 36, as follows. A second shaft 33 is arranged for continuous rotation by a motor 34, and is reversibly connected to a shaft 35 through clutch means 36. Clutch means 36 provides a mechanism whereby energy of rotation of shaft 33 is transmitted to shaft 35 either directly or in reverse, depending on which of two solenoids is energized. In the absence of energization of either solenoid, no energy of rotation is transmitted to shaft 35. The latter shaft carries a gear 37 which is connected by suitable gearing 40 with gear 17 carried by shaft 16. Thus, it will be seen that rotation of shaft 35 in a counterclockwise direction is adapted to apply torque to shaft 16 also in a counterclockwise direction. Motor 34 is provided with energy for continuous operation as by conductors 38 and 39, the latter being grounded. Electrical conductors 41 and 42 and ground connections 43 and 46 are arranged for connecting the solenoids in clutch 36 with amplifier 32. The latter is provided with electrical energy from any suitable source as by conductors 44 and 45, the latter being grounded.

Amplifier 32 includes a center tapped resistor whose halves cooperate with the portions into which winding 26 is divided by contact 25 to comprise a Wheatstone bridge which is in balance when contact 25 is in the center of winding 26. For all other positions of contact 25, the bridge is unbalanced, and an alternating signal voltage derived from conductors 44 and 45 is supplied by the bridge, varying in amplitude with the displacement of contact 25 from the center winding 26 and reversing in phase as contact 25 passes the center of winding 26. The signal voltage is amplified and energizes one or the other of the solenoids in clutch 36, depending on its phase compared with that of the source. Suitable amplifiers are well known in the art, and details of the structure of amplifier 32 are therefore not included in the present application.

The over-all function of this portion of our invention is therefore to cause application of torque to shaft 35 (refer now to Figure 1) in a first direction when gyroscope 14 tilts in a first direction, and in the opposite sense when the gyroscope tilts in the opposite direction.

Torque applied to shaft 35 is transmitted through gearing 40 to ring gear 17 and shaft 16. The force acting on shaft 16 is now reversed, and opposite precessive movement of contact 25 takes place, removing the signal from the amplifier when the shaft has been returned to its original position. Thus, the torque exerted on shaft 16 by link 127 is opposed, not directly by the rigidity of the gyroscope, but by the motor 34, which is for this reason referred to as the "torque motor" of the system although as a matter of fact it is continuously rotating, torque being obtained therefrom through slipping in clutches 36.

Means are provided whereby the course upon which the craft is stabilized by the gyroscope 14 may be changed at the will of the pilot. To accomplish this, a worm wheel 23 is rotatably mounted on shaft 16 in frictional drive relation thereto.

Mounted on housing 22 for movement therewith around shaft 16 is a motor 132 having a shaft 133 carrying a worm 134. Worm 134 engages worm wheel 23 so that in the absence of rotation of shaft 133 worm wheel 23 is locked to housing 22, as previously mentioned. On rotation of shaft 133, however, relative rotation may take place between housing 22 and shaft 16 independent of this joint rotation, and the effect of the resultant movement of arm 130 on control surface operator 131 is the same as a similar movement of arm 130 due to operation of gyroscope 14, clutch means 20, and so forth. It is thus clear that by energization of motor 132 it is possible to cause the control surface operator to change the course of the craft while the azimuth of the gyroscope remains unaltered. The means whereby such energization of motor 132 is accomplished will now be set forth.

A knob 135 is carried at one end of a hollow shaft 136, rotation of which causes rotation of a first sprocket 137 connected by a sprocket chain 141 with a second sprocket 140. The latter sprocket is carried on a second hollow shaft 142, which also carries a pair of contact arms 143 and 144, insulated therefrom, and moving about the surface of a circular resistance member 145. The rotation of hollow shaft 142 is in the same sense as the rotation of knob 135. Arms 143 and 144 and resistance member 145 comprise a first potentiometer 148. Contact arms 143 and 144 are electrically connected to a pair of slip rings 146 and 147 carried by shaft 142 and insulated therefrom. A pair of brushes 150 and 151 are provided for making contact with slip rings 146 and 147, and electrical conductors 152 and 153 make electrical connection between brushes 150 and 151 and an amplifier 154. Amplifier 154 is provided with electrical energy from any suitable source of alternating current by conductors 155 and 156.

Resistance member 145 is tapped at four equally spaced points around its circumference as at 157, 160, 161, and 162. For reasons presently to be set forth, resistance member 145 is mounted for rotation on a shaft 163, from which it is insulated, and taps 157, 160, 161, and 162 are connected to a number of slip rings 164, 165, 166, and 167 carried by and insulated from shaft 163. A like number of brushes 170, 171, 172, and 173 are provided for making electrical contact with slip rings 164, 165, 166, and 167, respectively, and are connected respectively by means of conductors 174, 175, 176, and 177 with similar taps 180, 181, 182, and 183 of a similar circular resistance member 184 fixed with respect to housing 22. Cooperating with member 184 to comprise a second potentiometer 185 is a second pair of contact arms 186 and 187, carried by and insulated from shaft 133 of motor 132, and connected thereto are a pair of slip rings 190 and 191 also carried by and insulated from shaft 133. A pair of brushes 192 and 193 cooperate with slip rings 190 and 191 and are connected by conductors 194 and 195 with amplifier 154. Motor 132 is connected with amplifier 154 by conductors 196, 197, and 200. It will thus be apparent that the combination of potentiometers 148 and 185, together with motor 132 and amplifier 154, comprise a multiple bridge type of telemetric system 215.

Potentiometers 148 and 185 comprise portions of an electrical bridge. When movable contacts 143 and 144 have a proper angular disposition on winding 145 compared with that of movable contacts 186 and 187 on winding 184, the bridge is in balance: this is the normal condition of this bridge circuit. If, however, knob 135 is manually rotated by the bombardier, the relationship between the angular disposition of contacts 143 and 144 on winding 145 and that of contacts 186 and 187 on winding 184 is altered, and an alternating potential is impressed upon the input of amplifier 154 which is of one phase or the opposite phase, depending on the direction of displacement of contacts 143 and 144 from the position of balance.

Amplifier 154 is of any suitable type wherein reversible actuation of a motor is caused by energization of the amplifier input with signals of reversible phase. Such amplifiers are well known in the art, and details of the structure of amplifier 154 are therefore not included in the present application.

The over all effect of this portion of our invention is therefore to cause housing 22 to rotate in a first direction with respect to shaft 16 when knob 135 is rotated in a first direction and in the opposite direction when the knob is rotated in the opposite direction.

The gear ratio between sprockets 137 and 140, and the number of teeth in worm wheel 23, are so chosen that the rotated displacement of housing 22 from its original position bears a selected ratio to the rotation of knob 135 to which it is due. In the preferred embodiment of our invention we make this a 1:1 ratio, and it will be obvious that a rotation of knob 135 through 15°, for example, then produces rotation of housing 22 with respect to shaft 16 through the same angle, resulting in displacement of arm 132 to cause operation of the control surface of the craft. Arm 132 does not return to its neutral position until the craft has changed its heading by the same angle; that is, by 15°, when the control surface is returned to its neutral position. Thus, a rotation of knob 135 in the preferred embodiment of our invention causes a change of equal magnitude in the course of the craft.

We have shown bombsight 12 as comprising a telescope 286 mounted for rotation about a normally horizontal axis 287, the latter being carried for rotation about a normally vertical axis in a ring gear 290. A pinion 291 is arranged in driving relation with ring gear 290 and is carried by a shaft 292 driven by motor 293. Shaft 292 also carries a worm 294 arranged in driving relation with a worm wheel 295 carried by a shaft 296. Electrical energy is provided to motor 293 by conductors 297, 300, and 301 from an amplifier 302, conductor 300 being grounded and amplifier 302 being supplied with electrical energy through conductors 303 and 304 from any suitable source of alternating current.

Mounted on shaft 296 and insulated therefrom are a pair of slip rings 305 and 306 connected to a pair of contact arms 307 and 310 also mounted on and insulated from shaft 296. Brushes 311 and 312 make contact with slip rings 305 and 306, and are connected by conductors 313 and 314 with amplifier 302.

Mounted on and insulated from shaft 163 is a third resistance member 315 which cooperates with movable contacts 307 and 310 to comprise a third potentiometer 316. A number of slip rings 317, 320, 321, and 322 are carried by and insulated from shaft 163 and make connection respectively with taps 323, 324, 325, and 326, equally spaced around member 315. Electrical connection is made with slip rings 317, 320, 321, and 322 by a like number of brushes 327, 330, 331, and 332, and these in turn are connected to conductors 333, 334, 335, and 336.

Shaft 163 traverses hollow shaft 142 and carries on its outer end a gear 337 which cooperates through a pinion 340, a shaft 341, a sprocket 342, a sprocket chain 343, and a sprocket 344, with a shaft 345 traversing hollow shaft 136, and carrying at its outer end a second manually adjustable knob 346. It is thus apparent that rotation of knob 346 acts to rotate shaft 163 in the reverse sense which is exactly opposite to the effect of rotating knob 135, as far as potentiometer 148 is concerned.

Shaft 35 carries and is insulated from a pair of contact arms 347 and 350, and a pair of slip rings 351 and 352 are also mounted on and insulated from shaft 35, electrical connections being made between contacts 347 and 350 and slip rings 351 and 352 respectively. A pair of brushes 353 and 354 cooperate with slip rings 351 and 352 and are connected by conductors 355 and 356 with amplifier 302. Fixed with respect to contacts 347 and 350, and cooperating therewith to form a fourth potentiometer 357 is a resistance member 360 tapped at equidistant spaced points 361, 362, 363, and 364 to which respectively are connected conductors 333, 334, 335, and 336. It will thus be apparent that the combination of potentiometers 316 and 357, together with motor 293 and amplifier 302, comprises a second multiple bridge type of telemetric system 365.

Potentiometers 316 and 357 comprise portions of an electrical bridge. When movable contacts 347 and 350 have the proper angular disposition on resistance member 360 compared with that of movable contacts 307 and 310 on resistance member 315, the bridge is in balance: This is the normal condition of this bridge circuit. If however, the relationship between the angular disposition of contacts 307 and 310 on member 315 and that of movable contacts 347 and 350 on member 360 is altered, an alternating potential is impressed upon the input of amplifier 302, which is of one phase or the other, depending on the direction of the relative displacement between the contactors of potentiometers 316 and 357.

Amplifier 302 is of any suitable type wherein reversible actuation of a motor is completed by energization of the input of the amplifier with signals of reversible phase. Such amplifiers are well known in the art and details of the structure of amplifier 302 are therefore not included in the present application.

It will be understood that if the craft diverges from a selected course, the line of sight of the telescope having previously been directed in a desired manner for flight along the desired course, the line of sight will be deflected from its proper alignment. While it is of course understood that return of the craft to its proper course will return the telescope to its proper alignment, nevertheless, it may be that during the time the craft has veered the bombardier should be synchronizing in preparation for releasing a bomb. A departure of the line of sight from its correct alignment, even if of short duration, would seriously impede the bombardier in his attempts to synchronize. The speed of operation of motor 293 is so great, however, that it is capable of returning the telescope to a desired position under the control of amplifier 302 much more quickly than the craft can be returned to its desired course under the operation of operator 131.

For this reason potentiometer 357 is made operable by shaft 35 whose operation controls the return of gyroscope 14 to its normal position. Veering of the craft causes resistance member 360 to rotate with respect to arms 347 and 350 which are stabilized by shaft 16 through gears 17, 40, and 37, giving these arms a different displaced arrangement with respect to the taps on member 357 from that held by contact arms 307 and 310 with respect to winding 315. A. C. input is thus provided to amplifier 302, energizing motor 293 to cause rotation of ring gear 290, at the same time causing rotation of arms 307 and 310 with respect to resistance member 315. The former rotation is in an opposite direction to the movement of the craft initiating it, so that the telescope returns to its desired azimuth setting. The latter rotation acts to rebalance the bridge 365.

Return of the craft from its deviated course to its desired course is accompanied by a tendency of gyroscope 14 to depart from its displaced position and therefore by a further rotation of resistance member 360, this time in the opposite direction to that which it took on departure of the craft from its course, and the telescope is turned with respect to the plane at the same rate as and in the opposite direction to the returning movement of the plane. Thus, for any azimuth movement of the plane in space a corresponding and opposite movement of the telescope is performed so that the target is at all times maintained in the same position in the field of the telescope. So sensitive is the bridge 365 and so rapid is the action of motor 293 that no perceptible change in the line of sight actually takes place.

The function of knob 346 will now be explained. As pointed out previously, it is desirable to control the movement of the craft by manipulation of the bombsight. If the target is out of range of the sight, in azimuth, and it is desired to bring the target into the sight, rotation of knob 135 is effective to cause turning of the craft through operation of motor 132, but through the operation of motor 293 under the influence of potentiometer 357 the line of sight is maintained in its original direction in space and is therefore generally no nearer the target than it was before the plane was turned. Means must therefore be provided for influencing both motors 132 and 293 simultaneously to cause both the plane and the sight to rotate in azimuth in space in the same direction. This function is performed by knob 346 acting through shaft 163 upon both member 145 and member 315, causing them to rotate simultaneously in the same direction. Thus, both multiple bridges are unbalanced and motors 132 and 293 are energized to operate contact arms 186—187 and 307—310 to rebalance the respective bridges. The direction of unbalance, however, is opposite to that brought about through the action of potentiometer 357 in the last example, so that the unbalance normally caused by potentiometer 357 responding to movement of shaft 35 is nullified by an equal and opposite unbalance caused by potentiometer 316 due to operation of knob 346, when the rates of operation of motors 34, 132, and 293 are properly selected.

Operation of knob 346 performs a secondary function in connection with synchronization in azimuth. It is well known to those familiar with the art of bombsights that if a craft flying with a wind having a cross component is continuously pointed at a target, the ground path of the craft is not a straight line toward the target, but rather a curve starting from the location of the craft at a given instant and ultimately approaching the target up-wind. It is found in practical applications of principles embodied in our invention that if, when a drift angle correction is inserted by use of knob 135, a displacement correction having a known proportion to the drift angle correction in terms of rotation of the several knobs is simultaneously put in by the use of knob 346, the curved path is thereafter reduced substantially to a straight line approach to the target, the proportion being of the order of 37 to 6. The ratio between gears 340 and 337 and sprockets 344 and 343 as compared to the ratio between sprocket wheels 137 and 140 is such as to provide this ratio between the effect of rotation of knobs 135 and 346.

Referring now to Figures 2 and 3, it will be apparent that taken together they comprise a wiring diagram of a complete system embodying our invention. In Figures 2 and 3, 366 refers generally to a power supply for the units comprising our system, 367 to a steering motor attachment, 371 to the Norden directional stabilizer, which is of known construction, and 372 to the Sperry bombsight, also of generally known construction but slightly modified for use in our system, and 370 to a control attachment.

Referring first to control attachment 370, examination will show that it is comprised of potentiometer 148, hereafter referred to as the steering leader potentiometer, potentiometer 357, hereafter referred to as the optics follower potentiometer, motor 293, hereafter referred to as the optics motor, a switch 373 and a set of six contacts 374, 375, 376, 377, 380, and 381. The steering leader and optics follower potentiometers and optics motor have been previously described and their operative relationship with amplifiers 154 and 302, and so forth, has been pointed out.

One terminal of switch 373 is grounded as at 382. To the other terminal of switch 373 are connected a pair of conductors 383 and 384 leading to power supply unit 366. The set of six contacts is arranged and mounted for making connection with a similar set of contacts 385, 386, 387, 390, 391, and 392 mounted in bombsight 372. Bombsight 372 further includes a three-phase gyroscope motor 393, a D. C. constant speed motor 394 including a governor arrangement generally indicated at 395, and gyro erecting means 396, also of three-phase construction. A plurality of manually operable switches 397, 400, 401, 402, and 459 also comprise a part of the bombsight as originally supplied. To the original equipment of the bombsight has been added a magnetic switch 403 and a manual switch 709 for a purpose presently to be set forth.

Directional stabilizer 371 comprises a directional gyro motor 404, an erection cut-out switch 407, a torque motor 406, clutch solenoids 115 and 116, potentiometer 27, and optics leader potentiometer 316. Steering motor attachment 367 comprises steering follower potentiometer 185 and steering motor 132.

Power supply unit 366 includes a battery 410 whose right hand terminal is positive as indicated, a single phase 120 cycle inverter 411, a three phase 400 cycle inverter 412, and a pair of magnetic switches 413 and 414.

In addition to the units thus described, the figures show amplifiers 32, 154, and 302 and a pair of switches 415 and 416. Switches 415 and 416 are normally located in the control panel of the automatic flight control and are operated by the pilot of the craft. One side of each of the switches is connected to the positive terminal 417 of battery 418 as by conductors 420 and 421 leading to a common positive bus bar 422.

Closing of switch 415 completes a circuit through a conductor 423 to the shunt wound direct current stabilizer gyro motor 404, the circuit being completed through a ground connection 424 at the gyro motor and a ground connection 425 to the negative terminal of the battery. Motor 404 is a shunt wound direct current motor. Closing of switch 416 completes a circuit through a conductor 426 to energize the shunt wound direct current torque motor 406, the circuit being completed through a ground connection 427 at the torque motor and ground connection 425.

One terminal of switch 407 is also connected to the positive terminal of battery 418 as by a conductor 430, conductor 421, and positive bus 422. Closing of switch 407 completes a circuit through a conductor 431 to the erection cut-out operator of the vertical gyro of the craft, for a purpose having no bearing on the present invention. The circuit is completed through a ground connection at the erection cut-out operator and ground connection 425.

Closing of switch 407 also completes a circuit through a conductor 433 leading to terminal 374 of control attachment 370. When the control attachment is installed on the bombsight, connection is made as indicated by the dotted line between contacts 374 and 385. Contact 385 is connected as by conductor 434 with one terminal of the winding 435 of magnetic switch 403: The other terminal thereof is grounded as by conductor 436. Therefore, closing of switch 407 energizes magnetic switch 403 to open a pair of normally closed circuits through contact blades 437 and 440. The energizing circuit can be traced as follows: From the positive terminal of the battery, bus 422, conductor 421, conductor 430, switch 407, switch 709, conductor 791, conductor 433, contact 374, contact 385, conductor 434, winding 435, ground connection 436, ground connection 425 and back to the battery. Interruption of the circuits through these contact arms acts to cut out the erection system of the bombsight in the same fashion as, and as a substitute for the system originally in the sight.

One end of the D. C. winding of three phase inverter 412 is connected with the negative terminal of battery 418 by conductor 437. The other end of the D. C. winding of inverter 412 is connected to the positive terminal of battery 410 by conductors 440, 441, 442, and 443, a circuit controlling arm 444 of magnetic switch 413 being included in series in this circuit. One terminal of the winding 445 of magnetic switch 413 is connected to the positive terminal of the battery by conductors 446, 442, and 443. The other terminal of winding 445 is connected by conductor 383 with switch 373 in the control attachment. It is thus apparent that on closing switch 373 a complete circuit is formed from the positive terminal of the battery through conductors 443, 442, 446, winding 445, conductor 383, switch 373, ground connection 382, ground connection 425 back to the negative terminal of the battery, thus energizing magnetic switch 413. Energization of switch 413 completes the circuit from the positive pole of the battery through conductors 443, 442, and 441, arm 444, conductor 440, the D. C. winding of the three phase inverter, conductor 437 and back to the negative terminal of the battery.

Operation of the 400 cycle inverter is thus initiated by energization of magnetic switch 413, and three phase 400 cycle alternating current is provided through conductors 447, 450, and 451 to contacts 377, 380, and 381 of attachment 370, and thence to contacts 390, 391, and 392, respectively in bombsight 372. In the bombsight, contact 390 is connected to one terminal of the bombsight motor as by conductors 452, 453, and 454, blade 455 of switch 459 being provided for interrupting the circuit. Contact 391 is connected to a second terminal of the gyro motor by conductors 456, 457, and 460, blade 461 of switch 459 being provided for interrupting the circuit, and contact 392 is connected to the third terminal of gyro motor 393 by conductors 462 and 463, no switch being provided in this circuit. When switch 459 is open, operation of motor 393 is interrupted since the supply of current to two of its phases is interrupted.

Contact 390 is also connected to a first terminal of the three-phase gyro erection device 396 by conductors 452 and 464. Contact 391 is also connected to a second terminal of the gyro erection system by conductors 456, 465, 466, and 467, switch 401 and blade 437 of magnetic switch 403 being included in series in this circuit. Contact 392 is also connected to a third terminal of gyro erection system 396 by conductors 462, 470, 471, and 472, switch 402 and contact arm 440 of magnetic switch 403 being connected in series in this circuit. It will now be clear that on energization of magnetic switch 403 by closure of switch 407 the supply of alternating current to the gyro erection mechanism 396 is cut off by interruption of the supply of two phases of the current for the erection means. It is also apparent that when magnetic switch 403 is not energized all three phases of the erection system are energized, subject to manual control of switches 401 and 402 which forms no part of this invention.

In the power supply one terminal of the three phase inverter is connecter to the negative terminal of battery 410, and therefore grounded as at 473. Terminal 381 is therefore connected not only with one phase of the three-phase alternating current but also with the negative terminal of the battery. Terminal 376 in the control attachment is connected to the positive terminal of the battery by conductor 474. Connector 387 cooperating with connector 376 is connected to one terminal 475 of D. C. motor 395 by conductors 476 and 477. The other terminal 480 of motor 394 is connected to contact 390 by conductors 481, 463', and 462. A circuit may therefore be traced from the positive terminal of the battery through bus 422, conductor 474, contact 376, contact 387, conductor 476, and conductor 477, to motor 395, thence by conductors 481, 463', 462, contacts 392 and 381, conductor 451, and conductor 437, back to the negative terminal of the battery.

Switches 397 and 400 are shown as connected in series between contact 386 and 387 by conductors 482, 483, 484, and 476, but it will be observed that connector 375 cooperating with connector 386 is not used in the practice of our invention, the function performed thereby in the original bombsight being otherwise accomplished.

One end of the D. C. winding of single phase inverter 411 is connected with the negative terminal of battery 410 by conductors 485 and 437. The other end of the D. C. winding of inverter 411 is connected to the positive terminal of battery 410 by conductors 486, 487, 490, and 443, the circuit control arm 491 of magnetic switch 414 being included in series in this circuit. One terminal of the winding 492 of magnetic switch 414 is connected to the positive terminal of the battery by conductors 493, 490, and 443. The other terminal of winding 492 is connected by conductor 384 with switch 373 in control attachment 370. It is thus apparent that on closing switch 373 a complete circuit is formed from the positive terminal of the battery through conductors 443, 490, 493, winding 492, conductor 384, switch 373, ground connection 382, and ground connection 425 back to the negative terminal of the battery, thus energizing magnetic switch 414. Energization of switch 414 completes a circuit through the D. C. winding of the inverter which may be traced from the positive pole of the battery through conductors 443, 490, 487, contact arm 491, conductor 486, the D. C. winding of the inverter, conductor 485 and back to the negative terminal of the battery. Operation of the single phase inverter is therefore initiated, by closing of switch 373, simultaneously with the initiation of operation of three phase inverter 412.

It will be noted that one terminal of the single phase winding of inverter 411 is connected to the negative terminal of the battery and to ground by conductor 494. The other A. C. terminal of the inverter is connected as by conductor 495 with input conductors 44, 156, and 303 of amplifiers 32, 154, and 302, respectively.

A ground connection 497 is provided and connected as by a conductor 500, to conductors 45, 156, and 304 of amplifiers 32, 154 and 302 respectively.

For a disclosure of the detailed structure of a preferred embodiment of our invention, reference is now made to Figures 4, 5, and 6 which disclose a control attachment built according to principles of our invention. Figure 5 is a continuation of Figure 4, and Figure 6 is a view showing portions broken away along the line generally indicated by 6—6 in Figure 4. Insofar as mechanical elements appearing in these figures have appeared in figures previously described, the same reference numerals have been applied. In Figure 5 it will be seen that knob 346 is secured to shaft 345 by a set screw 502 and that shaft 345 carries at the opposite end sprocket 344. Knob 135 is mounted on a spacing bushing, and the bushing is secured to shaft 135 by a set screw 504. Shaft 136 passes through a bushing 505 in the cover 506 of a housing 507, and an external shoulder 510 is provided on hollow shaft 136 for cooperating with the inner end of bushing 505. A bushing 511 is provided in housing 507 for the sprocket end of shaft 345. The lower end of hollow shaft 136 carries through sprocket wheel 137. It will be seen that, when these parts are assembled as indicated in the diagram, hollow shaft 136 is maintained in proper axial relationship with shaft 345 by a shoulder 512 provided on the latter, there being cooperation between bushing 503 and knob 346. The dimensions of bushing 505 are also calculated so that it cooperates with a hub 513 on the under side of cover plate 506, with shoulder 510 of hollow shaft 136, and with the lower edge of bushing 503 to suitably space and support the various parts. The first sprocket chain 141 is operably associated with sprocket 137 to connect it with sprocket 140 fixed on a shaft 142. It will be noted that shaft 142 in the actual mechanical structure corresponds to hollow shaft 142 in Figure 1, since I have found it more convenient to mount the resistance windings on the hollow shaft and the contact member on the solid shaft traversing it. This is merely an interchange of function of the two shafts and the system is otherwise exactly as disclosed in Figure 1. The second sprocket chain 343 cooperates with sprocket 344 and sprocket 342 fixed on shaft 341. A pair of rollers 520 and 521 suitably mounted are spring pressed against sprocket chains 141 and 343 respectively by a bifurcated spring member 522 in order to maintain a proper tension in the sprocket chains and remove any undesirable slack between the operation of the manual knob and resultant movement of the driven sprockets. Shaft 142 is provided with a bushing 523 in cover plate 506 and shaft 341 is provided with similar bushings 524 and 525 in cover plate 506 and housing 507 respectively. In addition to sprocket 343 there is also fixed on shaft 341 a gear 340 adapted for cooperating with a split anti-backlash gear 337 which is spun onto a hollow hub 530.

Gear case housing 507 is secured to potentiometer housing 536 by set screws 537 and a dowel 540 passing through a projecting boss 541 carried by housing 507. A cylindrical hollow projection 542 is provided on housing 536 to cooperate with a cylindrical bore 543 in gear case housing 507 to accomplish this mounting function. A further bore 544 is provided in housing 507 to receive a bearing member 545 which is held in position by the cooperation between bore 544 and the upper surface of projection 542. Hollow shaft 163 is supported at its upper end in bearing 545, which is therefore suitably aligned with bearing 523 in cover plate 506 so that hollow shaft 142 is suitably supported with respect to hollow shaft 163.

Member 542 is provided at its inner end with a bore 546 to receive an axially operative spring washer 548 and a bearing member 547 providing further support for hollow shaft 163. A bracket 550 is carried by housing 536 and a bushing 551 therein provides a suitable bearing for shaft 142 at the end remote from sprocket 140. A member 552 is mounted on shaft 142 by a set screw 553 to perform the function of rotating the members indicated in Figure 1 by 144 and 143.

Hollow shaft 163 is externally splined at its lower portion 554, and mounted on this splined portion is an internally splined member 555 performing the functions of resistance members 145 and 315, together with slip rings 164, 165, 166, and 167 and 317, 320, 321, and 322. The splined relationship between member 555 and shaft 163 permits comparatively free relative axial movement between the two, while at the same time preventing any angular play therebetween.

A bearing 558 in member 555 is provided to insure proper concentric relationship between member 555 and shaft 142 which traverses it and which engages the inner surface of bearing 558. A second bracket 556 is carried by housing 536 and is bored as at 557 to receive a bearing 560, A portion of bore 557 is threaded as at 561 to receive a threaded ring 562, adapted to bear against bearing member 560.

Clamped between bearings 560 and 547 by the action of ring 562 against washer 548 is a second hollow shaft 563 secured to yet another hollow shaft 564 by a set screw 565 for unitary rotation therewith. Shaft 563 carries worm wheel 295 and shaft 564 is externally splined near its lower portion as at 566 to receive the internally splined hub 567 of a member 570 generally performing the function of movable contacts 307 and 310 and slip rings 305 and 306 as indicated in Figure 1. The lower-most end of shaft 564 is threaded to receive a nut 571 which cooperates with a lock washer 572 to maintain member 570 securely pressed against a shoulder 573 on shaft 564.

Supported by housing 536 are a pair of contact supporting blocks 574. Slots are provided in these insulating blocks to receive a plurality of contact brushes arranged for cooperating with the slip rings of members 552, 555, and 570. The brushes are numbered, corresponding to their functions in Figure 1, as 311, 312, 327, 330, 331, 332, 170, 171, 172, 173, 150, and 151. The cooperating slip rings are indicated by reference numerals 305, 306, 317, 320, 321, 322, 164, 165, 166, 167, 147, and 146, respectively. The contact arms carried by members 574 are securely clamped by the action of bolts 575 and nuts 576. Blocks 574 are fastened to housing 536 by screws 580 which pass through elongated slots 581 in blocks 574, so that the blocks are permitted a certain degree of axial adjustment with respect to the concentric shafts bearing the various slip rings.

Fastened to blocks 574 as by bolts 582 are wire clamping members 583 supporting the various conductors leading to the contact members in blocks 574. To avoid unnecessarily complicating the drawing, the numbers given to these various conductors in Figure 1 have not been reproduced in this figure.

A pair of bosses 584 project from the walls of the housing and are bored to receive fastening members which form a part of the bombsight to which this attachment is adapted to be connected. A further pair of bosses 585 also project from the wall of housing 536 to support an insulating member 586 carrying on its outer surface contact members 374, 375, 376, 377, 380, and 381. The contact members are fastened to member 586 by suitable rivets 587. This mounting of the contacts is so arranged that when the attachment is assembled with the bombsight by means of members 584 and the cooperating members on the sight, the contact members mounted on member 586 make contact with cooperating contact members 385, 386, 387, 390, 391, and 392 in the sight. A wire clamping member 590, similar to member 583, is provided to support the conductors leading to the various contact members on member 586: the wire clamping member is secured to member 586 by screws 591.

Switch 373 is mounted on the housing 536 in a readily accessible position, and apertures 592 and 593 are provided in a wall of housing 536 for the support of suitable electrical connecting devices for conducting electrical energy to the various electrical elements in housing 536.

The structure of members 552, 555, and 570 will now be considered in more detail. Member 555 is shown in Figures 7 and 8 to comprise slip rings 167, 166, 165, 164, spaced by separators 644, and slip rings 322, 321, 320, and 317 also spaced by insulating separators 644. Slip rings 164 and 322 are spaced by an insulating separator 645. The slip rings and separators referred to are mounted on a pair of insulating hubs 646 and 647.

Figure 9 illustrates the structure of a slip ring, and it will be seen to comprise a disk 650 of electrically conducting material provided with four apertures 651 equally spaced around the disk at equal distances from its center with three further apertures 652 equally spaced between pairs of apertures 651 at greater distances from the center of disk 650, and an inwardly projecting tongue 653 located between the remaining pair of apertures 651 and extending radially outwardly a distance greater than the distance to the center of apertures 652.

In Figure 10 it is disclosed that after the disk has been manufactured the tongue portion 653 is bent twice at right angles to take the conformation indicated at 654. It will be realized that four such disks can be placed in face to face relationship, with the tongue of each upper disk projecting through the apertures 652 in one or more of the associated disks, and it will also be appreciated that by the provision of four apertures 652 the projecting tongue of each disk may be insulated against contact with any portion of the other disks, the assembly being mounted in proper relationship by fastening members passing through apertures 652. It will also be appreciated that if the tongue members of the several disks are made of different lengths to allow for the thickness of the various plates and insulating spacers therebetween, the surfaces of the final bends in the various tongues will be co-planar. This construction is illustrated in Figure 4 in which the tongues of slip rings 164 and 166 are shown co-planar at the lower end of member 555 and the tongues of slip rings 317 and 321 are shown as co-planar at the upper ends of member 555.

Referring now to Figure 8, it will be seen that an end view of member 555 as seen from the right is there presented. In the broken away portion of this figure, it will be seen that the face of hub 647 is recessed to receive a ring 655 of electrically resistant material, for example, sheet Nichrome, the latter being provided with inwardly projecting tabs 656. A ring 657 is provided with screws 660 threadedly engaging hub 647 for clamping ring 655 against the face of hub 647, the inner surface of ring 657 being coated with an insulating varnish to prevent electrical contact between the two rings. It may be assumed that the portion of ring 657 broken away in Figure 8 may be that overlying the tongue 653 of slip ring 317, said tongue being shown as emerging from an aperture 652 in hub 647 corresponding to the aligned apertures in disk 650. It is of course understood that spacers 644 are also provided with apertures adapted to align with the apertures 651 and 652 in disks 650 and hubs 646 and 647.

In Figure 8 there are also illustrated the heads of a set of rivets 661 traversing the apertures 651 in hubs 646 and 647 and spacers 644 and 645. The rivets cooperate with washers 642 and when tightly set down unite the hubs, slip rings, and separators into one unitary assembly to which resistance ring 655 and clamping ring 657 are assembled at one end. It will be understood that a similar arrangement is found at the other end of member 555 where a second resistance ring 662 is held in place by a clamping ring 663 as shown in the fragmentary broken away portion of Figure 7.

Figure 7 also shows the cooperation between member 555 and member 552, the same cooperation being understood to prevail at the other end of member 555 with member 570. Member 552 is constructed in a fashion generally similar to member 555. A hub 664 of insulating material is perforated for the passage of assembling members 665 and contact making rivets 666 and 667. Hub 664 is arranged in a fashion similar to hub 647 to support a pair of slip rings 146 and 147 separated by a spacer 670. A set screw 671 is provided in the end of hub 664 for fastening it to shaft 142 which it is bored to receive. It will be remembered that member 555 is provided with internal splines as indicated in Figure 7 for cooperation with external splines on hollow shaft 163.

Mounted on hub 664 by rivets 666 is a spring arm 143. Rivets 666 make electrical connection between spring arm 143 and slip ring 147. In the same fashion, rivets 667 make electrical connection between slip ring 146 and a second spring arm 144. Resistance ring 662 performs the function of member 145 in Figure 1 and it is arranged that when members 652 and 655 are in their appropriate axial relationship, arms 143 and 144 will contact ring 662 at diametrically spaced points.

By the structure just described, it will be seen that relative rotation between member 552 and member 555 causes movement of contact arms 143 and 144 around resistance member 662 to perform the function recited in connection with Figure. 1.

Referring now to Figure 6, it will be seen that worm 294 is carried on a shaft 292 driven by motor 293 and bearing on its outer end the male portion 594 of a coupling arrangement adapted to transmit rotation of shaft 292 to a gear in the bombsight referred to by reference numeral 291 in Figure 1. Member 594 is secured to shaft 292 by a set screw 595.

Shaft 292 is supported on a pair of bearings 596 and 597 in a gear case housing 600 associated with motor 293. Housing 600 is provided with a hollow cylindrical projection 602 adapted to be received in a circular aperture 603 in housing 536 in such a position that worm 294 engages worm wheel 295. Shaft 292 is provided with a shoulder 604 and projection 602 is provided with a shoulder 605 between which bearing 596 is received. Housing 600 is secured to housing 536 by a number of screws 606.

Secured to housing 600 by suitable means is a plate 607. Mounted in a bore in plate 607 is a cup-shaped member 610 adapted to receive bearing 597. Bearing 597 is pressed against a shoulder 612 on shaft 292 by means of a spring washer 613 acting between washers 614 and 615, the latter being prevented from moving axially of shaft 292 by a snap ring 616 engaged in a groove 617 near the end of shaft 292. Axial movement of shaft 292 and its various bearing members is therefore substantially prevented.

Fixed to shaft 292 by a suitable hub 620 is a gear 621 which engages a pinion 622 carried on the rotor shaft 623 of motor 293. Shaft 623 passes through a bearing 624 in plate 607, and is spring pressed in a direction toward pinion 622 by conventional mechanism in a central hub 625 provided at the end of the housing 626 of motor 293. A gasket 627 is provided between 626 of motor 293 and gear case 600, and the whole assembly is maintained in oil tight relationship by screws 606.

Securely fixed to shaft 623 as by a bushing 630 is a squirrel cage rotor 631 adapted to cooperate with a set of field windings 632 mounted in housing 626. Field windings 632 are maintained in position in the housing through the agency of a split ring 633 engaged in a suitable recess 634 in housing 626 and pressing against spacers 635.

Also fixed upon shaft 623 in a hub 636 to which is fastened by means of rivets 637 a friction member 640 adapted to cooperate with the flat surface 641 of bearing 624 for the purpose of minimizing hunting in the operation of motor 293.

Motor 293 an gears 621 and 622 are lubricated by a supply of oil maintained in housing 626 and gear case 600. For this reason a number of passages not shown are provided through plate 607, and oil pads 642 and 643 are provided to conduct lubricant by capillary action to points where lubrication is necessary. To prevent the passage of oil from gear case 600 into housing 536, an oil seal bearing has been selected for use in the position indicated at 596.

The effect of friction member 640 in reducing hunting in the motor may be explained as follows. Member 640 is made of Bakelite and member 624 is made of bronze. It has been found that when these two members are mounted for frictional engagement as disclosed herein under spring pressure as provided from hub 625, and suitably lubricated the friction between the members is much greater at very low speeds of rotation than it is at normal speeds of rotation. Thus the frictional effect of these two members is much greater in proportion at low motor speeds than at high motor speeds, and accordingly when the supply of electrical energy to the motor is interrupted and the speed of the motor falls off, it is brought to rest much more quickly by the use of these members than would occur if such members were not provided.

From the disclosure just recited, it will be obvious that the function of our control attachment is that performed by elements indicated within the dotted line 13 in Figure 1. It is obvious that for a complete system this control attachment must also cooperate with a directional stabilizer as indicated at 11 in Figure 1, which includes generally known structure, together with certain new motor drive and resistance pickup attachments whose mechanical structure will now be set forth in detail.

Our steering motor attachment is shown in Figures 11, 12, and 13 to comprise a housing 22 bearing at one end potentiometer 185 and at the other end motor 132. A section taken along the line 12—12 of Figure 11 is shown in Figure 12, and in this figure numeral 16 refers to the stabilized shaft of the directional stabilizer. Mounted on shaft 16 by an internally threaded member 675 cooperating with threads on shaft 16 is a hollow shaft 676. Worm wheel 23 is rotatably mounted on hollow shaft 676 and is maintained in frictional engagement therewith by friction element 20. A spring 677 maintains expansive force between a collar 680 and a shoe 681 which engages friction member 20. Shoe 681 is secured against rotation with respect to hollow shaft 676 by a key 682. Collar 680 is prevented from axial movement along hollow shaft 676 under the influence of spring 677 by any suitable means such as snap ring 683 fitting in an external groove in hollow shaft 676 and engaging the collar. Thus it will be seen that frictional engagement between worm wheel 23 and shoe 681 is provided by member 20, and that if the rotational force between members 23 and 681 is sufficiently large, relative motion may take place therebetween.

Hollow shaft 676 is mounted for rotation within a cylindrically eccentric adjusting bushing 686 by a pair of bearings 684 and 685. A clamping ring 687 is provided to maintain hollow shaft 676, bushing 686 and bearings 684 and 685 in the proper relationship, and suitable sealing rings 690 and 691 are also provided.

Bushing 686 is rotatably adjustable in housing 371 for the purpose of providing proper interdigitation between worm 154 and worm wheel 23, and a clamping ring 692 is provided with suitable bolts 693 for fixing the rotated relationship between bushing 686 and housing 671. From the structure just recited, it will be seen that on rotation of shaft 16 the entire housing is caused to rotate about the same axis, carrying with it the potentiometer, motor, and so forth. It will also be apparent that, providing the tension of spring 677 is suitably selected, rotation of worm wheel 23 may take place even when shaft 16 is prevented from rotating, by taking advantage of the slip friction introduced by the provision of member 20 between members 23 and 681.

Referring now to Figure 11, it will be seen that worm wheel 23 is actuated by motor 132 through worm 134 carried on shaft 133 driven by motor 132. Shaft 133 is supported in suitable bearings 694 and 695 held by threaded ring 696 and split ring 697 in a pair of bored bosses 700 and 701 rising out of housing 22. A pair of spacing collars 702 and 703 are mounted on shaft 133 to maintain it in the proper axis relationship for satisfactory engagement between worm 134 and worm wheel 23.

As indicated in Figure 1, housing 22 is provided with locking arm 21 for engaging with a locking mechanism carried by the directional stabilizer. It is also provided with arm 130 carrying a mechanical linkage 127 for transmitting rotation of housing 22 about the axis of shaft 16 into control of the course of the craft. Housing 22 furthermore carries a pivot 104 to which may be connected a link 105 adapted to provide stabilization of a bombsight or other device whose azimuth is to be controlled.

One end of the shaft 133 carries a female connection 706 adapted to cooperate with a male connection 707 driven by motor 132 for actuation of worm 134. The other end of shaft 133 projects through a flange 710 in housing 22 to operate the sliding contacts of potentiometer 185, best shown in Figures 11 and 13. The potentiometer is shown in section in Figure 11, the section being taken along the broken line 17—17 of Figure 13. It will be seen that the potentiometer is contained between flange 710 and a housing 711 fastened thereto as by screws 712.

The potentiometer comprises a short cylindrical insulating member 713 fastened to flange 710 by suitable means as by screws 714. Fastened to the cylindrical face of member 713 by a suitable means as by screws 715 are a pair of contact members 716 and 717 adapted to make contact respectively with a pair of slip rings 720 and 721 suitably mounted as by insulating members 722 and 723 on a hub 724 fixed by a pin 725 to shaft 133. A pair of contact arms 726 and 727 carried by insulating member 722 and connected respectively to slip rings 720 and 721 are arranged to make sliding contact with a resistance ring 730 clamped to member 713 by a clamping ring 731.

Conducting studs 732 traverse member 713 at points radially and circumferentially spaced to cooperate with the tabs 656 of resistance ring 730 to which they are welded, and suitable channels such as 733 are provided for making electrical connection with these studs. An aperture 734 is provided in flange 710 so that a multiple conductor cable may pass through for making connections to the four tabs of resistance ring 730 and to contact members 716 and 717.

From the structure above set forth, it will be seen that when shaft 133 is rotated, a change in the angular disposition of contacts 725 and 726 with respect to the tabs on resistance ring 730 takes place, thus affecting the electrical circuit in which potentiometer 185 is inserted. It will also be seen that rotation of housing 22 about the axis of shaft 16 as a unit causes no displacement of contacts 725 and 726 with respect to ring 730. The section indicated in Figure 13 is taken along the line 13—13 in Figure 11, and Figure 13 also shows a cover 735 arranged to cooperate with housing 22 to enclose the gear and slip friction mechanism and protect it from dirt and mechanical mistreatment.

A second flange 736 is provided on housing 22 for supporting motor 132 which drives through a gear reduction 737, a stub shaft 719 carrying male connection 707.

In Figure 1 we have shown schematically that a potentiometer is mounted in association with the directional stabilizer 11 for stabilization by shaft 35. Details of the embodiment of this portion of our invention are given in Figure 14 which discloses my potentiometer together with associated portions of the directional stabilizer. In this figure gyroscope 14 is shown as mounted in gimbal ring 15 in a housing 883. The gimbal ring rotates about a vertical axis not included in the fragmentary showing in Figure 14, and carries concentric with this axis the ring gear 17.

Mounted on housing 883 of the directional gyroscope is the housing 884 of servomotor 34. The end of shaft 33 of servomotor 34 is formed as a pinion 885 engaging the gear 886 carried on a shaft 887. Pinion 890 thereon meshes with one of a pair of gears 891, only one of which appears in the sectional view in Figure 21. As previously pointed out, motor 34 and therefore gears 891 are in continuous operation during use of the directional stabilizer.

Cooperating with the face of each gear 891 is a clutch member 892 operatively unitary with a gear 37. Engaging with both gears 37 is a gear 893 carried on a common shaft 894 with a second gear 895: Gear 895 meshes with gear 17 on the gimbal ring 15 of the directional gyro. In the normal condition of the servomotor, neither of clutch members 892 is in engagement with its opposed gear 891. It will be realized that since one of gears 891 meshes with pinion 890, and that the second of gears 891 meshes not with the pinion but with the first gear, it follows that gears 37 are urged in opposite directions when their respective clutches engage gears 891. Therefore when one of the clutch members is brought into frictional engagement with a cooperating gear member by electromagnetic means which do not appear in this section, torque is applied to ring gear 17 in one direction or the other depending on which of the members was actuated.

In the practice of our invention, shaft 894 is extended and carries at its upper end a gear 895 adapted to cooperate with a second gear 896 carried on the shaft 897 of potentiometer 357.

The potentiometer is mounted on housing 884 as by screws 900, and is of the general construction completely described and illustrated in connection with Figures 11 and 13. The bearing for shaft 897 is formed entirely within the insulating block 901 of potentiometer 357, and spring means 902 are provided for maintaining satisfactory contact between movable contacts 347 and 350 and resistance member 360. A suitable cover 903 is provided for the protection of servomotor 34 and potentiometer 357, and means are provided thereon for making electrical connection with the servomotor potentiometer and with the electromagnetic clutch elements. It will be seen by a comparison between Figures 1 and 14 that shaft 894 and shaft 897 of Figure 14 perform the function indicated schematically as being performed by shaft 35 in Figure 1.

It must be pointed out that the azimuth mechanism and directional stabilizer comprise two of the four essential parts of a bombsight, the other two parts being vertical stabilization and range computation. Our device may be operatively associated with any desired devices for performing these remaining functions, and such associated operation is within the scope of our invention, whether the additional devices be novel of themselves or old in the art.

Résumé

From the foregoing disclosure it will be apparent that in accomplishing the objects of our invention there has been worked out a system having three major characteristics. First, the aircraft and the bombsight can be both be stabilized in azimuth, the stabilizing means for the sight being more sensitive than that for the craft. Second, the attitude of the craft can be manually adjusted with respect to the stabilized axis, the direction of the line of sight remaining fixed in azimuth. Third, the attitude of the craft and the direction of the line of sight can be simultaneously adjusted manually with respect to the stabilized azimuth axis.

More specifically, our invention provides a directional stabilizer, establishing a stabilized azimuth axis, and a means for coordinating the attitude of an aircraft and the direction of a line of sight therewith. If the attitude of the craft changes with respect to the stabilized axis, control surfaces of the craft are at once actuated in the direction returning its attitude to proper relation with the stabilized axis. If, due to movement of the craft or for any other reason, the azimuth of the line of sight departs incrementally from that of the azimuth axis, operation of a motor 293 is immediately instituted to return the sight to proper alignment at a rapid rate. This correction in the direction of the line of sight takes place at a much more rapid rate than the correction in the attitude of the craft. When the craft veers, the sight is returned to its original direction in azimuth so quickly and with so slight a maximum departure from its original direction that the change is almost imperceptible: As the attitude of the craft is subsequently more slowly corrected, redirection of the line of sight takes place in the opposite direction and at the same rate.

A further more specific contribution of our invention is of general utility apart from and in addition to its applicability in this structure, and includes a motor 132, associated with the directional stabilizer 14 of the craft and energized in response to rotation of a manual knob 135, to bring about a change in the relation between the stabilized azimuth axis and the attitude of the craft; that is, to change the heading of the craft. A special feature of this contribution is to be found in the fact that the change in heading of the craft takes place at a constant predetermined rate, and through an angle determined by the angular rotation of the manual knob: That is, if the knob is rotated through any particular angle, the heading of the craft changes by the same angle, and at a constant rate regardless of the magnitude of the angular change.

In our particular application of this "steering" motor and control, correlated means are provided whereby deviation of the craft from its original attitude under the influence of the manual knob causes the same actuation of the motor correcting the direction of the line of sight as does deviation of the craft from its course from any external cause. The line of sight therefore maintains its direction in space, and no apparent motion of the target in the field of the sight takes place, although the line of sight is angularly displaced with respect to the heading of the craft. However, it should be clearly understood that our steering motor and control are applicable with equal advantage to the control of the course of any craft having a stabilized azimuth axis, entirely apart from the correlated structures shown in this application.

Our invention further provides manually operable means for simultaneously and oppositely affecting the relation between the stabilized azimuth axis on the one hand and the attitude of the aircraft and the direction of the line of sight on the other hand. By rotation of a second control knob 346, the heading of the craft is changed in one sense with respect to the azimuth axis, while the direction of the sight is equally changed in the opposite sense. Since the sight is carried by the craft whose heading is being changed, no resultant relative movement takes place between the craft and the sight, and the line of sight appears to move in azimuth unitarily with the craft.

In the practice of our invention we set up a pair of telemetric systems 275 and 365, each comprising an electric bridge circuit including endless potentiometers of novel design. In each of our telemetric systems a first potentiometer is adjusted in accordance with need for performance of a control function, and the bridge unbalance is fed through an amplifier to energize a motor; operation of the motor performs the needed control function, and at the same time adjusts a second potentiometer to balance the bridge. A significant contribution of our invention in this connection lies in the interrelation of our two telemetric systems so that operation of a first control knob 135 adjusts the responsive potentiometer of only one telemetric system, while operation of a second control knob 346 independently adjusts potentiometers in both telemetric systems simultaneously.

A further feature of our invention may be found in the provision of a unitary attachment for a bombsight including in compact convenient form 13 the manual controls referred to above, together with their potentiometers and also including motor drive means and simple means for releasably coupling the motor drive means with the mechanism of the bombsight to operatively affect the direction of the line of sight in azimuth.

In the subjoined claims terminology is used which will now be defined. Controlled means are control surface operator 131 and telescope 286. Adjusting means are motors 132 and 293; motor means also includes motor 34. Telemetric systems are 275 and 355: each includes a pickup potentiometer and a follow-up potentiometer, whose functions are interchangeable, and a rebalancing motor. Members to be positioned are 127 and 291. The stabilizing means is gyroscope 14; the directional stabilizer includes members 14, 16, 27, 36, 34, 37 and 40. The words first and second cannot be here defined, as in claims of differing scope they must of necessity refer to different members.

From a study of the specification and drawings herein, it will be obvious to those skilled in the art that we have disclosed certain preferred embodiments of means of accomplishing the various objects of this invention previously set forth. The use of such embodiments and their conventional equivalents thereof comprises the practice of our invention, and since it is understood that numerous changes, substitutions and expedients will doubtless occur to competent workers in this field, we hold the scope of our invention to be limited only as set forth in the subjoined claims.

We claim as our invention:

1. In combination, stabilizing means, first controlled means operatedly associated with said stabilizing means, first adjusting means providing variation in the normal relation between said stabilizing means and said first controlled means, second controlled means operatedly associated with said stabilizing means, second adjusting means providing variation in the normal relation between said stabilizing means and said second controlled means, first manual means varying said first adjusting means, and second manual means simultaneously varying said first and said second adjusting means.

2. In a device of the class described, in combination, means maintaining a stabilized attitude in space, means for operating a control surface of a craft, means connecting said last named means with said first named means, means directing a line of sight along an axis, means operatively connecting said last named means with said first named means, first manual means adjusting said first connecting means, and second manual means simultaneously adjusting both said connecting means.

3. A control system, for associating a controlled device with a control and stabilizing device, comprising in combination: a first telemetric system including first motor means actuated thereby and first manual means causing operation thereof, operation of said system being adapted to affect a control function of said control and stabilizing device; a second telemetric system including second motor means actuated thereby, operation of said second telemetric system effecting operation of said controlled device: means actuated by said control and stabilizing device for influencing operation of said second telemetric system: and second manual means causing operation of both said first and said second telemetric systems.

4. A control system for a controlled device comprising a control attachment, a motor drive attachment, and a stabilized resistance pickup: said control attachment comprising first and second resistance members tapped at selected points, and first and second movable members cooperating with said first and second resistance members respectively, each of said movable members carrying a plurality of contacts slidingly engaging its cooperating resistance member at selected spaced points; said motor drive attachment comprising a resistance member tapped at selected points and a movable member carrying a plurality of contacts slidingly engaging said resistance member at selected points; said resistance pickup comprising a resistance member tapped at selected points and a movable member carrying a plurality of contacts slidingly engaging said resistance member at selected points: the angular displacements between the selected points on said first resistance member in said control attachment and between the selected points on said resistance member in said motor drive attachment being electrically equivalent, the angular displacements between the selected points on said second resistance member in said control attachment and between the selected points on said resistance member of said resistance pickup being electrically equivalent, the angular displacements between said contacts of said first movable member in said control attachment and between said contacts of said movable member of said motor drive attachment being electrically equivalent; and the angular displacements between said contacts of said second movable member in said control attachment and between said contacts on said movable member of said resistance pickup being electrically equivalent.

5. In combination, stabilizing means, controlled means operatedly associated with said stabilizing means, adjusting means providing variation in the normal relation between said stabilizing means and said controlled means, speed regulated motor means responsively actuating said adjusting means, and a balanceable proportioning system for controlling the operation of said motor means, including manual means for unbalancing said proportioning system at any desired rate and means driven by said motor means for rebalancing said system at a selected rate determined by the regulated speed of said motor means.

6. In a device of the class described, in combination, means for performing a control function, a stabilized shaft, means mounting said first means for rotation about said shaft including, motor means carried by said mounting means and means frictionally engaging said shaft, cooperating means actuated by operation of said motor, and means energizing said motor, whereby to cause rotation of said mounting means about said shaft, rotation of said mounting means moving said first mentioned means to affect selective performance of said control function.

7. In a device of the class described, in combination, a gyro-stabilized shaft, a member rotatably mounted on said shaft, means carried by said member for causing operation of a control surface of a craft, motor means carried by said member, gear means actuated by operation of said motor means, cooperating gear means frictionally associated with said shaft, whereby upon energization of said motor means said member is caused to rotate about said shaft to effect operation of said control surface, a first impedance member carried by said first-named member, movable contact means actuated by operation of said motor means for cooperation with said first impedance member to form a potentiometer, a second impedance member, movable contact means actuated manually for cooperation with said second impedance member to form a second potentiometer, means connecting said potentiometers to form a bridge circuit, means supplying electrical energy to said bridge circuit, and means selectively energizing said motor means in response to selective unbalance of said bridge.

8. In combination, stabilizing means, motor means, manual operating means, and a telemetric system operatively associating said means, said system comprising first variable impedance means operatedly associated with said stabilizing means and second variable impedance means operatedly associated with said motor means and said manual adjusting means.

9. In combination, a member to be positioned, motor means for positioning said member, stabilizing means, manual adjusting means, and a telemetric system operatively associating said motor means, said manual means and said stabilizing means, said telemetric system comprising an impedance member, a contact member, said stabilizing means causing relative movement between said members, a further impedance member and, a further contact member, said motor means and said manual means independently causing relative movement between said further members, means supplying electrical energy to one of said contact members, and means energizing said motor for selective forward and reverse operation in accordance with the electrical energy transmitted to the other of said contact members.

10. In a device of the class described, in combination, a gyro-stabilized shaft, a housing rotatably mounted on said shaft, motor means carried by said member, gear means actuated by operation of said motor means, and cooperating gear means frictionally associated with said shaft, whereby upon energization of said motor means said housing is caused to rotate about said shaft.

11. In a device of the class described, in combination, a gyro-stabilized shaft, a member rotatably mounted on said shaft, motor means carried by said member, gear means actuated by operation of said motor means, cooperating gear means frictionally associated with said shaft, whereby upon energization of said motor means said member is caused to rotate about said shaft, an impedance member carried by said member, and movable contact means actuated by operation of said motor means for cooperation with said impedance member to form a potentiometer.

12. In a device of the class described, in combination, a stabilized shaft, a member rotatably mounted on said shaft, motor means carried by said member, gear means actuated by operation of said motor means, cooperating gear means frictionally associated with said shaft, whereby upon energization of said motor means said member is caused to rotate about said shaft, an impedance member carried by said member, movable contact means actuated by operation of said motor means for cooperation with said impedance member to form a potentiometer, and means carried by said first named member for affecting a control function when said member is rotated from a normal position with respect to said stabilized shaft.

13. In a device of the class described, a motor drive attachment comprising, in combination, a socket adapted to be secured to the shaft of a stabilizing device, a member rotatably carried by said socket, motor means carried by said member, first gear means frictionally engaging said socket, cooperating gear means actuated by said motor means, an impedance member mounted on said member, rotatable means providing adjustable electrical contact with said impedance member at selectedly spaced points, and means providing driving relation between said motor means and said rotatable means.

14. In a device of the class described, a motor drive attachment comprising, in combination, a socket adapted to be secured to the shaft of a stabilizing device, a member rotatably carried by said socket, motor means carried by said member, first gear means frictionally engaging said socket, cooperating gear means actuated by said motor means, an impedance member mounted on said first named member, rotatable means providing adjustable electrical contact with said impedance member at selectedly spaced points, means providing driving relation between said motor means and said rotatable means, means carried by said member for cooperating with a locking mechanism carried by said stabilizing device, and means for providing connection between said member and a controlled device.

15. In a device of the class described, in combination, a directional stabilizer having a housing, a first member stabilized in azimuth by said stabilizer, a first potentiometer carried by said stabilizer and adjusted thereby in response to change in azimuth in the position of said stabilizer, a second member rotatably carried by said stabilizer, means normally maintaining frictional engagement between said first member and said second member, means for locking said second member with respect to said housing to prevent relative movement therebetween, motor means for causing relative rotation between said second member and said first member, and a second potentiometer adjusted by said last mentioned means.

16. In a device of the class described, in combination, a gyroscope having a normally horizontal spin axis, a cardan ring mounted for rotation about a normally vertical axis, said gyroscope being mounted in said cardan ring for relative rotation with respect thereto about a second normally horizontal axis perpendicular to said first horizontal axis and to said vertical axis, a vertical shaft unitary with said cardan ring; said vertical axis coinciding with the axis of said vertical shaft, a member rotatably mounted with respect to said axis, means normally maintaining frictional engagement between said shaft and said members, means locking said member against rotation with respect to said vertical shaft, whereafter rotation of said locking member about said axis causes precessive rotation of said gyroscope from a normal position about said second normally horizontal axis, motor means adapted to rotate said vertical shaft whereby to precessively return said gyroscope to said normal position, a first potentiometer adjusted by said motor means, electrically actuated adjusting means carried by said member for varying the rotated relationship between said member and said shaft, and a second potentiometer adjusted by said last mentioned means.

17. In a device of the class described, a member to be driven, motor means for driving said member, first and second variable impedance devices, each of said devices comprising first and second relatively movable portions, said first portions of said first and second devices being arranged for unitary movement, first manual means for causing said unitary movement, second manual means for causing relative movement between said first and second portions of said first device, operation of said motor means causing relative movement between said first and second members of said second device.

18. In a device of the class described, a shaft, manual means for causing rotation of said shaft, first and second endless impedance members unitarily mounted on said shaft for rotation therewith, means providing electrical connections to each of said members at selected fixed points, first and second independently rotatable means providing adjustable electrical contact with said impedance members at selectedly spaced points, further manual means causing rotation of said first rotatable means with respect to said first member, motor means, an output connection driven by said motor means, and means operably associating said motor means with said second rotatable means, whereby operation of said motor may cause relative movement between said second rotatable means and said second member.

19. In a device of the class described, a control attachment comprising in combination, a housing, means adapting said housing for association with a controlled device, electrical contact members carried by said housing for cooperation with contact members carried by said device, mechanical output means carried by said housing for engaging driven means in said device, motor means for actuating said mechanical output means, first and second impedance members mounted for unitary rotation in said housing, first manual means for rotating said impedance members, first and second independently rotatable means providing adjustable electrical contact with said first and second resistance members at selectedly spaced points, second manual means for rotating said first rotatable means with respect to said first impedance member, means operatively associating said mechanical output and said second rotatable means for rotating said means with respect to said second impedance member, circuit interrupting means, and means for conducting electrical energy to said resistance members, said rotatable members, and said circuit interrupting means.

20. In a device of the class described, a shaft, manual means for causing rotation of said shaft, first and second endless impedance members unitarily mounted on said shaft for rotation therewith, means providing electrical connections to each of said members at selected fixed points, first and second independently rotatable means providing adjustable electrical contact with said impedance members at selectedly spaced points, further manual means causing rotation of said first rotatable means with respect to said first member, motor means including means frictionally opposing operation of said motor means, said opposition increasing with decrease in the speed of said operation, an output connection driven by said motor means, and means operably associating said output connection with said second rotatable means, whereby operation of said motor may cause relative rotation between said second rotatable means and said second member.

21. In a device of the class described; a first generally cylindrical member comprising a plurality of electrical collector rings, a ring of resistance material mounted on an end of said cylinder, said resistance ring being provided with a plurality of taps at spaced intervals therearound, electrically insulating means spacing said rings along the axis of said cylinder, means traversing said insulating means and connecting each of said taps with one of said collector rings, and means mounting said cylinder for rotation; a second generally cylindrical member comprising a plurality of electrical collector rings, electrically insulating means spacing said rings along the axis of said cylinder, a plurality of contact means mounted on an end of said cylinder, means traversing said insulating means and connecting each of said contact members to one of said collector rings, and means mounting said cylinder axially spaced from said first cylinder for rotation independent of and coaxial with that of said first cylinder, said contact members being adapted for sliding contact with said resistance ring.

22. In a device of the class described; a first generally cylindrical member comprising a plurality of electrical collector rings, a ring of resistance material mounted on an end of said cylinder, said resistance ring being provided with a plurality of taps at spaced intervals therearound, electrically insulating means spacing said rings along the axis of said cylinder, means traversing said insulating means and connecting each of said taps with one of said collector rings, and means mounting said cylinder for rotation; a second generally cylindrical member comprising a plurality of electrical collector rings, electrically insulating means spacing said rings along the axis of said cylinder, a plurality of contact means mounted on an end of said cylinder, means traversing said insulating means and connecting each of said contact members to one of said collector rings, means mounting said cylinder axially spaced from said first cylinder for rotation independent of and coaxial with that of said first cylinder, said contact members being adapted for sliding contact with said resistance ring, and a plurality of contact members fixedly mounted for continuous contact with said various collector rings, whereby to conduct electrical energy to said collector rings.

23. In a device of the class described; a first generally cylindrical member comprising a plurality of electrical collector rings, rings of resistance material mounted on the ends of said cylinder, each of said resistance rings being provided with a plurality of taps at spaced intervals therearound, electrically insulating means spacing said rings along the axis of said cylinder, means traversing said insulating means and connecting each of said taps with one of said collector rings, and means mounting said cylinder for rotation; further generally cylindrical members each comprising a plurality of electrical collector rings, electrical insulating means spacing said rings along the axes of said cylinders, a plurality of contact means mounted on an end thereof, and means traversing said insulating means and connecting each of said contact means to one of said collector rings; and means mounting said further cylinders axially spaced from said first cylinder for rotation independent of and coaxial with those of said first cylinder and of each other, said contact means of said further cylinders being adapted for responsive sliding contact with said resistance rings.

24. In a device of the class described; a first generally cylindrical member comprising a plurality of electrical collector rings, rings of resistance material mounted on the ends of said cylinder, each of said resistance rings being provided with a plurality of taps at spaced intervals therearound, electrically insulating means spacing said rings along the axis of said cylinder, means traversing said insulating means and connecting each of said taps with one of said collector rings, and means mounting said cylinder for rotation; further generally cylindrical members each comprising a plurality of electrical collector rings, electrical insulating means spacing said rings along the axes of said cylinders, a plurality of contact means mounted on an end of each of said cylinders, means traversing said insulating means in each of said cylinders and connecting each of said contacts to one of said collector rings, means mounting said further cylinders axially spaced from said first cylinder for rotation independent of and coaxial with those of said first cylinder and of each other, said contact means of said further cylinders being adapted for responsive sliding contact with said resistance rings, and a plurality of contact members fixedly mounted for continuous contact with said various collector rings, whereby to conduct electrical energy to said collector rings.

25. In combination: means responsive to deviation of a craft from a selected attitude; attitude control means normally actuated by said first named means; first adjusting means providing variation in the normal relation between said attitude control means and said first named means; a viewing device; means normally controlling the direction of said device in accordance with the response of said first named means; second adjusting means providing variation in the normal relation between said viewing device and said first named means; first manual means varying said first adjusting means; and second manual means simultaneously varying said first and said second adjusting means.

26. In combination: means responsive to deviation of a craft from a selected attitude; attitude control means normally actuated by said first named means; first adjusting means providing variation in the normal relation between said attitude control means and said first named means; a viewing device; means normally controlling the direction of said device in accordance with the response of said first named means; second adjusting means providing variation in the normal relation between said viewing device and said first named means; and manual means simultaneously varying said first and said second adjusting means.

27. In combination: a gyroscope; an aircraft control surface operator; means normally connecting said operator in controlled relation to said gyroscope; adjusting means providing variation in the normal relation between said gyroscope and said operator; motor means responsively actuating said adjusting means; a proportioning system for controlling the operation of said motor means, comprising a variable control impedance member and a follow up impedance member electrically connected together to form a rebalanceable network, means operated by said motor for adjusting said follow up impedance member, and independent manual means for adjusting said control impedance member to adjust said proportioning system.

28. In combination: attitude responsive means; attitude controlling means; means normally connecting said controlling means in controlled relation to said responsive means; adjusting means providing variation in the normal relation between said controlling means and said responsive means; a proportioning system; constant speed motor means actuating said adjusting means in response to said proportioning system at a predetermined rate; and manual means for adjusting said proportioning system at any desired rate; said system comprising a first component adjusted by said motor means and a second component adjusted by said manual means.

JOHN F. SCHOEPPEL.
ALBERT PALYA.

REFERENCES CITED

The following references are of record in the file of this patent:

UNITED STATES PATENTS

| Number | Name | Date |
|---|---|---|
| 1,725,599 | Sperry | Aug. 20, 1929 |
| 1,965,378 | Hodgman | July 3, 1934 |
| 2,248,616 | Faus | July 8, 1941 |
| 2,270,991 | Bagno | Jan. 27, 1942 |
| 2,287,002 | Moseley | June 16, 1942 |
| 2,308,521 | Lear | Jan. 19, 1943 |
| 2,317,807 | Ryder | Apr. 27, 1943 |
| 2,372,185 | Wittkuhns | Mar. 27, 1945 |

Certificate of Correction

Patent No. 2,524,998                         October 10, 1950

JOHN F. SCHOEPPEL ET AL.

It is hereby certified that error appears in the printed specification of the above numbered patent requiring correction as follows:

Column 13, line 68, before the word "sprocket" strike out "through"; column 17, line 71, after "between" insert *housing*; column 18, line 7, for "in" read *is*; line 13, for "an" read *and*; column 19, line 34, for "axis" read *axial*; column 21, line 35, after "can" strike out "be";

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*